United States Patent
Woodsum et al.

(10) Patent No.: US 10,454,727 B2
(45) Date of Patent: Oct. 22, 2019

(54) TRANSPOSITIONAL MODULATION

(71) Applicant: TM IP HOLDINGS, LLC, Tucson, AZ (US)

(72) Inventors: Harvey C. Woodsum, Bedford, NH (US); Richard C. Gerdes, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 0 days.

(21) Appl. No.: 15/880,766

(22) Filed: Jan. 26, 2018

(65) Prior Publication Data

US 2018/0302263 A1 Oct. 18, 2018

Related U.S. Application Data

(63) Continuation of application No. 15/491,569, filed on Apr. 19, 2017, now Pat. No. 9,882,764.
(Continued)

(51) Int. Cl.
*H03D 5/00* (2006.01)
*H04L 27/00* (2006.01)
(Continued)

(52) U.S. Cl.
CPC ....... *H04L 27/0008* (2013.01); *H04B 14/004* (2013.01); *H04B 14/006* (2013.01);
(Continued)

(58) Field of Classification Search
CPC ....... H04L 27/361; H04L 27/02; H04L 27/32; H04L 27/144; H04L 27/12; H04L 27/122; H04W 8/005
(Continued)

(56) References Cited

U.S. PATENT DOCUMENTS 3,706,945 A 12/1972 Yanagidaira
3,968,486 A 7/1976 Gerdes
(Continued)

FOREIGN PATENT DOCUMENTS

WO WO2004040403 A1 5/2004
WO WO2012082781 A1 6/2012
(Continued)

OTHER PUBLICATIONS

M. Leclerc et al: "Performance analysis of an in-band COFDM / FM digital audio broadcasting system", Electrical and Computer Engineering, Sep. 14-17, 1993, pp. 652-655.
(Continued)

*Primary Examiner* — Khai Tran
(74) *Attorney, Agent, or Firm* — Fish & Richardson P.C.

(57) ABSTRACT

Methods, systems, and apparatus, including computer programs encoded on a computer storage medium, for modulating and demodulating transpositional modulated (TM) signals. One aspect features a method of modulating a carrier signal that include the actions of generating a TM signal by generating a sinusoidal signal, and modulating the sinusoidal signal based on a data signal to provide the TM signal. Inserting the TM signal into a carrier signal to provide a TM modulated carrier signal. Modulating the TM modulated carrier signal with a non-TM signal to provide a combined signal. Transmitting the combined signal.

28 Claims, 16 Drawing Sheets

Related U.S. Application Data

(60) Provisional application No. 62/485,255, filed on Apr. 13, 2017.

(51) Int. Cl.
   *H04B 14/00* (2006.01)
   *H04L 27/34* (2006.01)
   *H04B 14/08* (2006.01)

(52) U.S. Cl.
   CPC .......... *H04L 27/0012* (2013.01); *H04L 27/34* (2013.01); *H04B 14/08* (2013.01); *H04L 2027/0051* (2013.01)

(58) Field of Classification Search
   USPC .................. 375/269, 259, 268, 316, 362
   See application file for complete search history.

(56) References Cited

U.S. PATENT DOCUMENTS

| | | |
|---|---|---|
| 4,259,888 A | 4/1981 | Gross |
| 4,301,415 A | 11/1981 | McFayden |
| 4,584,534 A | 4/1986 | Lijphart et al. |
| 4,613,974 A | 9/1986 | Vokac |
| 4,680,633 A | 7/1987 | Gerdes |
| 4,989,219 A | 1/1991 | Gerdes |
| 5,021,786 A | 6/1991 | Gerdes |
| 5,119,391 A | 6/1992 | Maeda |
| 5,124,706 A | 6/1992 | Gerdes |
| 5,184,218 A | 2/1993 | Gerdes |
| 5,200,715 A | 4/1993 | Gerdes |
| 5,327,237 A | 7/1994 | Gerdes |
| 5,511,100 A | 4/1996 | Lundberg |
| 5,557,333 A | 9/1996 | Jungo |
| 6,052,410 A | 4/2000 | Okita |
| 6,173,062 B1 | 1/2001 | Dibachi |
| 6,522,697 B1 | 2/2003 | Spickermann |
| 6,559,757 B1 | 5/2003 | Deller |
| 6,788,154 B2 | 9/2004 | Maneatis |
| 6,829,310 B1 | 12/2004 | Nata et al. |
| 7,856,050 B1 | 12/2010 | Wiss |
| 8,472,514 B2 | 6/2013 | Dabiri |
| 8,537,952 B1 | 9/2013 | Arora |
| 9,014,293 B2 | 4/2015 | Gerdes |
| 9,338,041 B1 | 5/2016 | Gerdes |
| 9,338,042 B1 | 5/2016 | Gerdes |
| 9,379,925 B2 | 6/2016 | Gerdes |
| 9,426,014 B1 | 8/2016 | Gerdes |
| 9,455,852 B1 | 9/2016 | Gerdes |
| 9,455,863 B1 | 9/2016 | Gerdes |
| 9,461,854 B1 | 10/2016 | Gerdes |
| 9,473,983 B1 | 10/2016 | Gerdes |
| 9,515,815 B2 | 12/2016 | Gerdes |
| 9,516,490 B1 | 12/2016 | Gerdes |
| 9,621,386 B2 | 4/2017 | Gerdes |
| 9,621,398 B2 | 4/2017 | Gerdes |
| 9,628,318 B1 | 4/2017 | Gerdes |
| 9,882,764 B1 | 1/2018 | Woodsum et al. |
| 2001/0038309 A1 | 11/2001 | Hagemeyer |
| 2003/0053794 A1 | 3/2003 | Krouglov |
| 2003/0071684 A1 | 4/2003 | Noori |
| 2003/0108088 A1* | 6/2003 | Odenwalder .......... H04B 1/707 375/146 |
| 2003/0142741 A1 | 7/2003 | Hartmann |
| 2004/0247041 A1 | 12/2004 | Biedka |
| 2004/0252531 A1 | 12/2004 | Cheng |
| 2005/0200391 A1 | 9/2005 | Steinbach |
| 2006/0006914 A1 | 1/2006 | Fan |
| 2006/0187755 A1* | 8/2006 | Tingley ................. E21B 47/16 367/82 |
| 2006/0197564 A1 | 9/2006 | Yen |
| 2007/0041485 A1 | 2/2007 | Chang |
| 2008/0253479 A1 | 10/2008 | Davidow |
| 2009/0135957 A1* | 5/2009 | Norris .................. H04L 25/067 375/330 |
| 2009/0154589 A1 | 6/2009 | Monnerie |
| 2010/0128713 A1 | 5/2010 | Le |
| 2011/0043039 A1 | 2/2011 | Mancebo |
| 2011/0051780 A1 | 3/2011 | Kawasaki |
| 2011/0151821 A1 | 6/2011 | Sorrells |
| 2011/0222621 A1 | 9/2011 | Christensen |
| 2012/0171963 A1 | 7/2012 | Tsfaty |
| 2014/0201212 A1 | 7/2014 | Qi |
| 2014/0269969 A1 | 9/2014 | Gerdes |
| 2015/0023456 A1 | 1/2015 | Vann |
| 2015/0200796 A1 | 7/2015 | Gerdes |
| 2016/0173302 A1 | 6/2016 | Gerdes |
| 2016/0197751 A1 | 7/2016 | Gerdes |
| 2017/0026211 A1 | 1/2017 | Gerdes |
| 2017/0033968 A1 | 2/2017 | Gerdes |
| 2017/0085404 A1 | 3/2017 | Gerdes |

FOREIGN PATENT DOCUMENTS

| | | |
|---|---|---|
| WO | WO2014143046 A1 | 9/2014 |
| WO | WO2014145868 A1 | 9/2014 |
| WO | WO2017019130 A1 | 2/2017 |
| WO | WO2017019131 A1 | 2/2017 |

OTHER PUBLICATIONS

Yang Liu et al: "High Order QAM Signals Recognition Based on Layered Modulation", ICCCAS 2009. International Conference on Communications, Circuits and Systems, IEEE, Jul. 23, 2009, pp. 73-76.

J. B. Evans et al: "The Rapidly Deployable Radio Network", IEEE Journal on Selected Areas in Communications, IEEE Service Center, vol. 17, No. 4, Apr. 1, 1999, pp. 689-703.

Scott Chiu et al: "A 900 MHz UHF RFID Reader Transceiver IC", IEEE Journal of Solid-State Circuits, IEEE Service Center, Piscataway, NJ, USA vol. 42, No. 12, Dec. 1, 2007, pp. 2822-2833.

Pascal Scarlart et al.: "Performance Analysis of a COFDM/FM In-band Digital Audio Broadcasting System", IEEE Transactions on Broadcasting, IEEE Service Center, Piscataway, NJ, US; vol. 43, No. 2, dated Jun. 1, 1997, XP01100607; pp. 191-198.

International Search Report and Written Opinion in International Application No. PCT/US2018/027282, dated Jul. 4, 2018, 17 pages.

Nguyen, "The Behavior of a Costas Loop in the Presence of Space Telemetry Signals," IEEE Transactions on Communications, Jan. 1992, 40: 190-198.

* cited by examiner

| Digital Data | TM Symbol |
|---|---|
| 000 | $\theta_0$ |
| 001 | $\theta_1$ |
| 010 | $\theta_2$ |
| 011 | $\theta_3$ |
| 100 | $\theta_4$ |
| 101 | $\theta_5$ |
| 110 | $\theta_6$ |
| 111 | $\theta_7$ |

(B)

300

| Digital Data | TM Symbol | |
|---|---|---|
| 0000 | $\theta_0$ | $\varepsilon_0$ |
| 0001 | $\theta_1$ | $\varepsilon_0$ |
| 0010 | $\theta_2$ | $\varepsilon_0$ |
| 0011 | $\theta_3$ | $\varepsilon_0$ |
| 0100 | $\theta_4$ | $\varepsilon_0$ |
| 0101 | $\theta_5$ | $\varepsilon_0$ |
| 0110 | $\theta_6$ | $\varepsilon_0$ |
| 0111 | $\theta_7$ | $\varepsilon_0$ |
| 1000 | $\theta_0$ | $\varepsilon_1$ |
| 1001 | $\theta_1$ | $\varepsilon_1$ |
| 1010 | $\theta_2$ | $\varepsilon_1$ |
| 1011 | $\theta_3$ | $\varepsilon_1$ |
| 1100 | $\theta_4$ | $\varepsilon_1$ |
| 1101 | $\theta_5$ | $\varepsilon_1$ |
| 1110 | $\theta_6$ | $\varepsilon_1$ |
| 1111 | $\theta_7$ | $\varepsilon_1$ |

```
┌─────────────────────────────────────────────────────┐
│ Receive a combined signal including a carrier signal│
│ modulated with a transpositional modulation (TM)    │
│ signal and a non-TM signal                          │
│                                                1002 │
└─────────────────────────────────────────────────────┘
                          ↓
┌─────────────────────────────────────────────────────┐
│ Determine average values of the combined signal over│
│ respective symbol frames of the non-TM signal       │
│                                                1004 │
└─────────────────────────────────────────────────────┘
                          ↓
┌─────────────────────────────────────────────────────┐
│ Demodulate the non-TM signal based on the average   │
│ values                                              │
│                                                1006 │
└─────────────────────────────────────────────────────┘
                          ↓
┌─────────────────────────────────────────────────────┐
│ Remove the non-TM signal from the combined signal   │
│                                                1008 │
└─────────────────────────────────────────────────────┘
                          ↓
┌─────────────────────────────────────────────────────┐
│ Demodulate the TM signal                            │
│                                                1010 │
└─────────────────────────────────────────────────────┘
```

*FIG. 10*

TRANSPOSITIONAL MODULATION

CROSS REFERENCE TO RELATED APPLICATIONS

This application is a continuation of U.S. patent application Ser. No. 15/491,569, filed Apr. 19, 2017, which claims priority under 35 U.S.C. § 119 to U.S. Provisional Patent Application No. 62/485,255, filed Apr. 13, 2017, which are hereby incorporated by reference in their entirety.

BACKGROUND

Carrier modulation techniques are used to transmit information signals from one location to another. Traditional signal modulation techniques include, for example, amplitude modulation (AM), frequency modulation (FM), phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM).

SUMMARY

This specification relates to methods and systems for conducting electronic communications using transpositional modulation (TM). More specifically, the specification relates to methods and systems for generating TM signals and methods and systems for demodulating TM signals.

In a first aspect, the disclosure features methods of modulating a carrier signal that include the actions of generating a transpositional modulation (TM) signal by generating a sinusoidal signal, and modulating the sinusoidal signal based on a data signal to provide the TM signal. Inserting the TM signal into a carrier signal to provide a TM modulated carrier signal. Modulating the TM modulated carrier signal with a non-TM signal to provide a combined signal. Transmitting the combined signal. Other implementations of this aspect include corresponding systems, apparatus, and computer programs, configured to perform the actions of the methods, encoded on computer storage devices.

In a second aspect, the disclosure features methods of modulating a carrier signal that include the actions of generating a transpositional modulation (TM) signal by generating a sinusoidal signal, and modulating a phase of the sinusoidal signal based on a data signal to provide the TM signal. Inserting the TM signal into a carrier signal to provide a TM modulated carrier signal. Transmitting the TM modulated carrier signal. Other implementations of this aspect include corresponding systems, apparatus, and computer programs, configured to perform the actions of the methods, encoded on computer storage devices.

These and other implementations can each optionally include one or more of the following features. In some implementations, inserting the TM signal into the carrier signal includes inserting the TM signal into a phase of the carrier signal to provide a TM modulated carrier signal. In some implementations, the TM signal is inserted into the phase of the carrier signal by adding the TM signal to the phase of the carrier signal.

In some implementations, inserting the TM signal into the carrier signal includes inserting the TM signal into a frequency of the carrier signal to provide a TM modulated carrier signal. In some implementations, the TM signal is inserted into the frequency of the carrier signal by adding the TM signal to the frequency of the carrier signal.

In some implementations, the sinusoidal signal has a frequency that is an integer multiple of a symbol rate of data symbols of the non-TM signal.

In some implementations, modulating the sinusoidal signal based on the data signal to provide the TM signal includes modulating a phase of the of the sinusoidal signal based on the data signal to provide the TM signal.

In some implementations, modulating the phase of the sinusoidal signal based on the data signal to provide the TM signal includes altering the phase of the sinusoidal signal by discrete phase shifts for each data value in the data signal. In some implementations, changes in values of the discrete phase shifts are timed to correspond with an integer multiple of a period of the sinusoidal signal. In some implementations, each discrete phase shift is a TM symbol that represents a data value of the data signal.

In some implementations, modulating the sinusoidal signal based on the data signal includes modulating both a phase and an amplitude of the sinusoidal signal based on the data signal to provide the TM signal.

In some implementations, a symbol period of the TM signal is an integer multiple of a period of the sinusoidal signal.

In some implementations, the non-TM modulation signal is a QAM signal.

In some implementations, the non-TM signal is an amplitude modulation signal, a frequency modulation signal, or a phase modulation signal.

In some implementations, the data signal is a first data signal, and wherein the non-TM signal is modulated based on a second data signal. In some implementations, the second data signal is distinct from the first data signal. In some implementations, the first data signal includes a first portion of a third data signal and the second data signal includes a second portion of the third data signal.

In some implementations, the method includes, before transmitting the combined signal, filtering the combined signal.

In some implementations, the carrier signal is an intermediate frequency carrier signal and the method further includes upshifting the combined signal to a frequency of a transmission carrier signal.

In some implementations, modulating the sinusoidal signal based on the data signal to provide the TM signal includes modulating an amplitude of the of the sinusoidal signal based on the data signal to provide the TM signal. In some implementations, a symbol period of the TM signal is an integer multiple of a half-cycle of the sinusoidal signal.

In a third aspect, the disclosure features methods of modulating a carrier signal that include the actions of modulating a carrier signal with a non-transpositional modulation (non-TM) signal to provide a non-TM modulated carrier signal. Generating a transpositional modulation (TM) signal by generating a sinusoidal signal, and modulating the sinusoidal signal based on a data signal to provide the TM signal. Inserting the TM signal into the non-TM modulated carrier signal to provide a combined signal. Transmitting the combined signal. Other implementations of this aspect include corresponding systems, apparatus, and computer programs, configured to perform the actions of the methods, encoded on computer storage devices.

These and other implementations can each optionally include one or more of the following features. In some implementations, inserting the TM signal into the non-TM modulated carrier signal includes inserting the TM signal into a phase of the non-TM modulated carrier signal to provide a combined signal. In some implementations, the TM signal is inserted into the phase of the non-TM modulated carrier signal by adding the TM signal to the phase of the non-TM modulated carrier signal.

In some implementations, inserting the TM signal into the non-TM modulated carrier signal includes inserting the TM signal into a frequency of the non-TM modulated carrier signal to provide a combined signal. In some implementations, the TM signal is inserted into the frequency of the non-TM modulated carrier signal by adding the TM signal to the frequency of the non-TM modulated carrier signal.

In some implementations, the sinusoidal signal has a frequency that is an integer multiple of a symbol rate of data symbols of the non-TM signal.

In some implementations, modulating the sinusoidal signal based on the data signal to provide the TM signal includes modulating a phase of the of the sinusoidal signal based on the data signal to provide the TM signal.

In some implementations, modulating the phase of the sinusoidal signal based on the data signal to provide the TM signal includes altering the phase of the sinusoidal signal by discrete phase shifts for each data value in the data signal. In some implementations, changes in values of the discrete phase shifts are timed to correspond with an integer multiple of a period of the sinusoidal signal. In some implementations, each discrete phase shift is a TM symbol that represents a data value of the data signal.

In some implementations, modulating the sinusoidal signal based on the data signal includes modulating both a phase and an amplitude of the sinusoidal signal based on the data signal to provide the TM signal.

In some implementations, a symbol period of the TM signal is an integer multiple of a period of the sinusoidal signal.

In some implementations, the non-TM modulation signal is a QAM signal.

In some implementations, the non-TM signal is an amplitude modulation signal, a frequency modulation signal, or a phase modulation signal.

In some implementations, the data signal is a first data signal, and wherein the non-TM signal is modulated based on a second data signal. In some implementations, the second data signal is distinct from the first data signal. In some implementations, the first data signal includes a first portion of a third data signal and the second data signal includes a second portion of the third data signal.

In some implementations, the method includes before transmitting the combined signal, filtering the combined signal.

In some implementations, the carrier signal is an intermediate frequency carrier signal and the method further includes upshifting the combined signal to a frequency of a transmission carrier signal.

In some implementations, modulating the sinusoidal signal based on the data signal to provide the TM signal includes modulating an amplitude of the of the sinusoidal signal based on the data signal to provide the TM signal. In some implementations, a symbol period of the TM signal is an integer multiple of a half-cycle of the sinusoidal signal.

In a fourth aspect, the disclosure features methods of demodulating a carrier signal that include the actions of receiving a combined signal that includes a carrier signal modulated with both a transpositional modulation (TM) signal and a non-TM signal. Determining average values of the combined signal over respective symbol frames of the non-TM signal. Demodulating the non-TM signal based on the average values of the combined signal. Removing the non-TM signal from the combined signal. And, demodulating the TM signal. Other implementations of this aspect include corresponding systems, apparatus, and computer programs, configured to perform the actions of the methods, encoded on computer storage devices.

These and other implementations can each optionally include one or more of the following features. In some implementations, determining the average values includes determining an average magnitude value of the combined signal over respective symbol frames of the non-TM signal.

In some implementations, determining the average values includes determining an average phase value of the combined signal over respective symbol frames of the non-TM signal.

In some implementations, determining the average values includes determining an average magnitude value and an average phase value of the combined signal over respective symbol frames of the non-TM signal.

In some implementations, the non-TM signal is a QAM signal.

In some implementations, the method includes shifting the combined signal to an intermediate frequency.

In some implementations, the method includes shifting the combined signal to baseband.

In some implementations, removing the non-TM signal from the combined signal includes removing the non-TM signal from a buffered copy of the combined signal. In some implementations, removing the non-TM signal from the combined signal includes using recovered symbol values of the non-TM signal to remove the non-TM signal from a buffered copy of the combined signal. In some implementations, removing the non-TM signal from the combined signal includes dividing respective frames of the combined signal by a magnitude and a phase value of a corresponding one of the recovered symbol values of the non-TM signal In some implementations, demodulating the TM signal includes extracting the TM signal from the phase of the carrier signal, and detecting discrete phase shifts of the TM signal.

In some implementations, demodulating the TM signal includes extracting the TM signal from the phase of the carrier signal, and detecting phase shifts and amplitude shifts of the TM signal.

In a fifth aspect, the disclosure features methods of demodulating a carrier signal that include the actions of receiving a modulated carrier signal that includes a carrier signal modulated with a transpositional modulation (TM) signal. Determining an average phase of the modulated carrier signal over a symbol period of the modulation signal. Generating a reference signal based on the average phase of the carrier signal. Extracting the TM signal from the carrier signal by determining a time varying phase difference between the modulated carrier signal and the reference signal, the time varying phase difference representing the TM signal. And, demodulating the TM signal by identifying discrete phase shifts between the modulation signal and the reference signal. Other implementations of this aspect include corresponding systems, apparatus, and computer programs, configured to perform the actions of the methods, encoded on computer storage devices.

These and other implementations can each optionally include one or more of the following features. In some implementations, the method includes shifting the modulated carrier signal to an intermediate frequency. In some implementations, the method includes shifting the modulated carrier signal to baseband. In some implementations, demodulating the TM signal further includes detecting amplitude shifts of the TM signal.

In a sixth aspect, the disclosure features a transmitter that includes a transpositional modulation (TM) signal generator, a non-TM signal modulator, and an internal carrier modulator coupled to the TM signal generator and to the non-TM signal modulator. The TM signal generator is configured to receive a first data signal, and generate a TM signal by modulating a sinusoidal signal based on the first data signal to provide the TM signal. The non-TM signal modulator is configured to modulate a carrier signal with a non-TM signal based on a second data signal. The internal carrier modulator is configured to receive the TM signal from the TM signal generator and insert the TM signal into the carrier signal.

This and other implementations can each optionally include one or more of the following features. In some implementations, the TM signal generator includes a framed signal modulator that is configured to generate the TM signal by modulating a phase of the sinusoidal signal based on the first data signal to provide the TM signal. In some implementations, modulating the phase of the sinusoidal signal based on the data signal to provide the TM signal includes altering the phase of the sinusoidal signal by discrete phase shifts for each data value in the data signal. In some implementations, changes in values of the discrete phase shifts are timed to correspond with an integer multiple of a period of the sinusoidal signal. In some implementations, each discrete phase shift is a TM symbol that represents a data value of the data signal.

In some implementations, the TM signal generator includes a framed signal modulator that is configured to generate the TM signal by modulating an amplitude of the sinusoidal signal based on the first data signal to provide the TM signal. In some implementations, a symbol period of the TM signal is an integer multiple of a half-cycle of the sinusoidal signal.

In some implementations, the TM signal generator includes a framed signal modulator that is configured to generate the TM signal by modulating both a phase and an amplitude of the sinusoidal signal based on the first data signal to provide the TM signal.

In some implementations, the internal carrier modulator is configured to insert the TM signal into a phase of the carrier signal.

In some implementations, the internal carrier modulator is configured to insert the TM signal into a frequency of the carrier signal.

In some implementations, the sinusoidal signal has a frequency that is an integer multiple of a symbol rate of the non-TM signal.

In some implementations, the non-TM modulation signal is a QAM signal.

In some implementations, the non-TM signal is an amplitude modulation signal, a frequency modulation signal, or a phase modulation signal.

In some implementations, the second data signal is distinct from the first data signal.

In some implementations, the first data signal includes a first portion of a third data signal and the second data signal includes a second portion of the third data signal.

In some implementations, the TM signal generator further includes a TM symbol mapper configured to encode values of the first data signal into TM symbols for the TM signal.

In some implementations, the TM symbols include a phase shift, an amplitude shift, or both a phase shift and an amplitude shift.

In a seventh aspect, the disclosure features a receiver that includes a frame-averaged signal estimator, a transpositional modulation (TM) signal separator coupled to the frame-averaged signal estimator, a TM signal demodulator coupled to the TM signal separator, and a non-TM signal demodulator coupled to the frame-averaged signal estimator. The frame-averaged signal estimator is configured to receive a combined signal that induces a carrier signal modulated with both a transpositional modulation (TM) signal and a non-TM signal, and determine average values of a combined signal over respective symbol frames of the non-TM signal. The TM signal separator is configured to separate the TM signal from the non-TM signal of the combined signal. The TM signal demodulator is configured to demodulate the TM signal. The non-TM signal demodulator is configured to demodulate the non-TM signal based on the average values of the combined signal This and other implementations can each optionally include one or more of the following features. In some implementations, the frame-averaged signal estimator is configured to determine the average values of the combined signal by determining an average magnitude value of the combined signal over respective symbol frames of the non-TM signal.

In some implementations, the frame-averaged signal estimator is configured to determine the average values of the combined signal by determining an average phase value of the combined signal over respective symbol frames of the non-TM signal.

In some implementations, the frame-averaged signal estimator is configured to determine the average values of the combined signal by determining an average magnitude value and an average phase value of the combined signal over respective symbol frames of the non-TM signal.

In some implementations, the non-TM signal is a QAM signal.

In some implementations, the TM signal separator is configured to separate the TM signal from the non-TM signal by removing the non-TM signal from a buffered copy of the combined signal.

In some implementations, the TM signal separator is configured to separate the TM signal from the non-TM signal by using recovered symbol values of the non-TM signal to remove the non-TM signal from a buffered copy of the combined signal.

In some implementations, the TM signal separator is configured to separate the TM signal from the non-TM signal by dividing respective frames of the combined signal by a magnitude and a phase value of a corresponding one of the recovered symbol values of the non-TM signal.

In some implementations, the TM signal demodulator is configured to extract the TM signal from the phase of the carrier signal, and detect discrete phase shifts of the TM signal.

In some implementations, the TM signal demodulator is configured to extract the TM signal from the phase of the carrier signal, and detect phase shifts and amplitude shifts of the TM signal.

Particular implementations of the subject matter described in this specification can be implemented so as to realize one or more of the following advantages. Implementations may increase the data rate of signals transmitted using traditional modulation schemes. Implementations may permit the combination of two differently modulated signals on a single carrier frequency. Implementations may increase the data throughput of individual wired or wireless data links.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A depicts charts of exemplary symbol maps for TM symbols in accordance with implementations of the present disclosure.

FIGS. 9 and 10 depict example processes that can be executed in accordance with implementations of the present disclosure.

Like reference numbers and designations in the various drawings indicate like elements.

DETAILED DESCRIPTION

Figure 1:
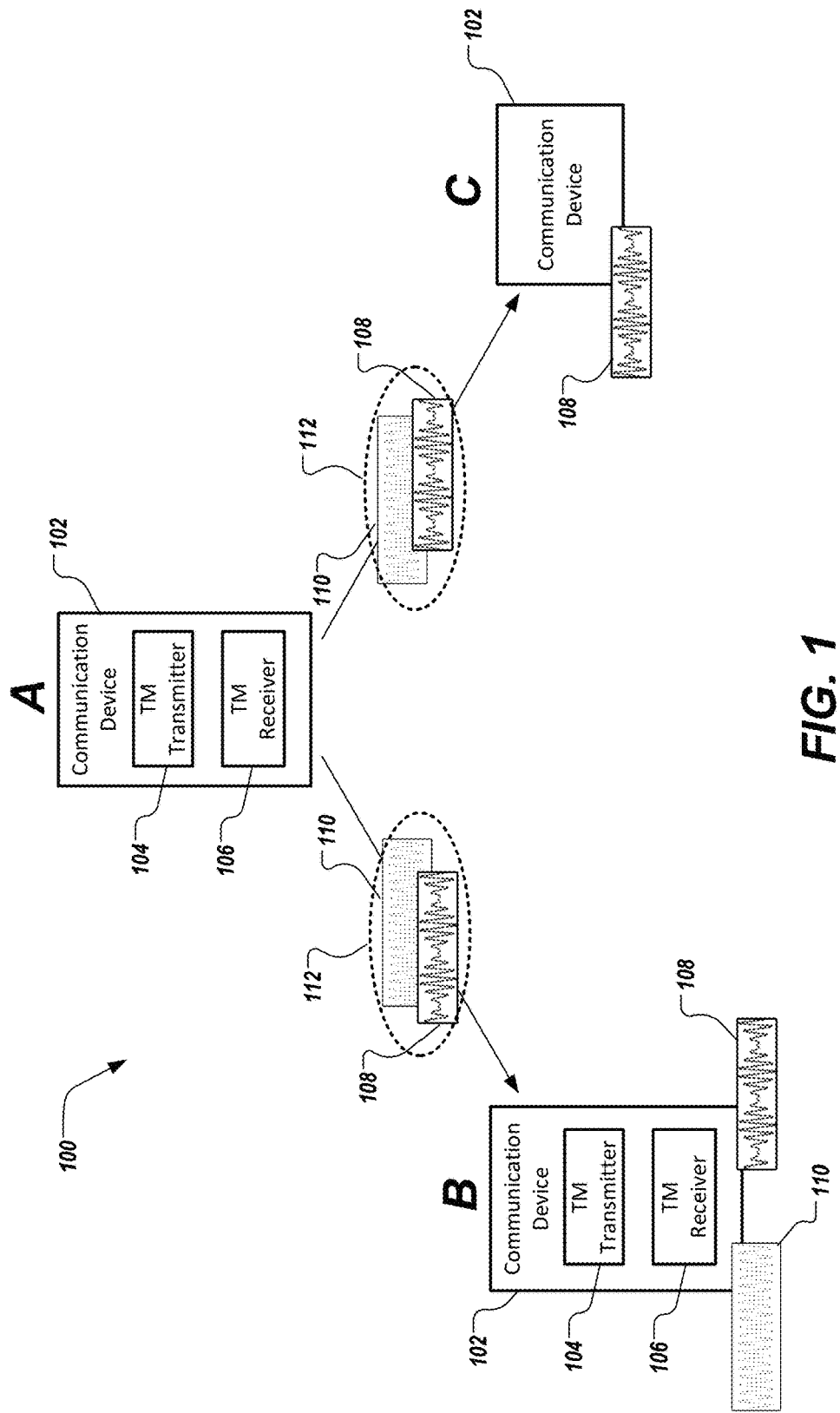
FIG. 1 depict example systems in accordance with implementations of the present disclosure.

Implementations of the present disclosure generally relate to conducing electronic communications using transpositional modulation (TM). More specifically, implementations relate to methods and systems for generating TM signals and methods and systems for demodulating TM signals.

As used herein the terms "Transpositional Modulation," "TM modulation," "TM," and "TM signal" refer to techniques of adding information to a carrier signal without affecting the amplitude, frequency or phase of the carrier signal (or a signal that is modulated according to such a technique) as observed by a traditional receiver or demodulator (e.g., a non-TM capable receiver/demodulator. For example, as discussed below, transpositional modulation signal can be generated by a technique referred to herein as the "internal TM modulation" technique. In this technique information is conveyed by altering a periodic signal (a "internal TM modulation signal") which is applied to a carrier signal. Any effects of the TM internal modulation signal on either the carrier wave itself or another traditional modulation signal (e.g., non-TM signal) carried by the carrier wave cancel over the symbol frame of a non-TM modulation signal, and consequently, are not detectable by a traditional signal demodulator. In addition, other processes for producing transpositional modulation include, for example, a type of modulation in which information is conveyed by altering (e.g., transposing, time shifting) a harmonic of a carrier signal. For example, transpositional modulation can be produced by altering a third harmonic or other harmonics of a carrier signal (e.g., a fourth harmonic, fifth harmonic, sixth harmonic, etc.) (referred to as the "harmonic TM modulation" technique for producing transpositional modulation). Other processes for generating transpositional modulation signals include modulating the inflection points of a carrier wave to represent data (referred to as the "wide-band TM modulation" technique for producing transpositional modulation). Examples of other documents that describe the use of transpositional modulation and/or other techniques for performing modulation and demodulation of TM signals include, but are not limited to, U.S. Pat. No. 9,014,293 entitled "TRANSPOSITIONAL MODULATION SYSTEMS AND METHODS;" U.S. Pat. No. 9,338,041 entitled "EXTRACTING CARRIER SIGNALS FROM MODULATED SIGNALS;" U.S. Pat. No. 9,338,042 entitled "SEPARATING AND EXTRACTING MODULATED SIGNALS;" U.S. Pat. No. 9,473,983 entitled "TRANSPOSITIONAL MODULATION COMMUNICATIONS BETWEEN DEVICES;" U.S. Pat. No. 9,515,815 entitled "TRANSPOSITIONAL MODULATION SYSTEMS, METHODS AND DEVICES;" U.S. Pat. No. 9,516,490 entitled "IDENTIFYING DEVICES WITH TRANSPOSITIONAL MODULATION;" and U.S. Pat. No. 9,628,318 entitled "TRANSPOSITIONAL MODULATION COMMUNICATIONS." TM signals generated by each of the above techniques share the same characteristics in that the TM signals add information to a carrier signal without affecting the amplitude, frequency or phase of the carrier signal as observed by a traditional demodulator (e.g., non-TM demodulator) and the TM signals are not detectable by traditional demodulators, for example, those used for amplitude, frequency, or phase modulated signals.

FIG. 1 depicts an example system 100 in accordance with implementations of the present disclosure. The system 100 is a system of communication devices 102. The system 100 may be a radio frequency (RF) communication system, a satellite communication system, a landline communication system (e.g., a telephony or cable network), an optical communication system, a computer network, or any other system of communication devices 102. The communication devices 102 include systems for modulating a carrier signal with an information signal using traditional modulation techniques and transmitting and receiving the modulated signal from one communication device 102 to/from another. For example, communication device A may be a cellular base station, and communication devices B and C may be mobile devices (e.g., smartphones).

Communications devices A, B, and C include a traditional (e.g., non-TM) transmitter and receiver. Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). In addition, communication devices A and B include a TM transmitter 104 and a TM receiver 106. In some examples, a TM transmitter 104 and/or a TM receiver 106 can be integrated with traditional transmitters and receivers. The TM transmitter 104 and/or TM receiver 106 can be implemented as hardware devices (e.g., integrated circuits, chip-sets, application specific integrated circuits (ASIC) or field programmable logic arrays (FPGA)) or they can be implemented in software (e.g., as a software defined radio (SDR)).

The system 100 can combine non-TM (e.g., traditionally modulated) signals 108 with TM modulated signals 110 on the same carrier using a TM transmitter 104, thereby, increasing the overall data rate of the combined signal 112. The TM modulated signal 110 can be separated from the combined signal 112 and demodulated by a TM receiver 106. Likewise, the traditionally modulated signal 108 can be separately demodulated with no significant interference caused by the TM modulated signal 110. This is possible because TM modulated signals are undecipherable by non-TM receivers, instead appearing as a slight increase of noise in traditionally modulated signals.

For example, communication device A may transmit a combined signal 112 including a QAM signal 108 and a TM modulated signal 110 on the same carrier signal. Communication device B can then receive the combined signal 112. A non-TM receiver in communication device B is used to detect and demodulate the non-TM signal 108. The TM receiver 106 of communication device B separates and extracts the TM modulated signal 110 from the combined signal 112, and then demodulates the TM modulated signal 110 to obtain the TM modulated data signal. On the other hand, communication device C, which does not have a TM receiver 106, will only detect and demodulate the traditionally modulated signal 108; not the TM modulated signal 110.

In some implementations, the carrier signal can be an intermediate frequency (IF) carrier signal. That is, the carrier signal is not necessarily at the same frequency of the carrier upon which the signal is ultimately be transmitted, but may be at an IF used internally within a system (e.g., a satellite communication system) as an intermediate step in either signal transmission or reception. That is, in the case of signal transmission, a system may up-convert a combined signal 112 from the IF signal to a transmission carrier frequency prior to transmitting the combined signal 112. Conversely, in the case of signal reception, a system may down-convert a modulated signal from the transmission carrier frequency to an IF frequency before separating the TM modulated signal 110 from the combined signal 112. In other implementations, an IF carrier signal may not be used, and the transmission carrier signal can be modulated with both a traditionally modulated signal and a TM modulated signal.

Electronic communications between communication devices A, B, and C can be performed through wired communication channels, wireless communication channels, or both. For example, communication devices 102 can be configured with one or more antennae to conduct wireless communications through a wireless channel including, but not limited to, a satellite communication channel, a wireless computer networking communication channel, and a cellular communication channel. Communication device 102 can be configured to conduct communication through a wired communication channel including, but not limited to, a telephone network, cable networks, an Ethernet network, or serial communication channels (e.g., USB, Thunderbolt, etc.). Communication devices 102 can include, but are not limited to, cellular base stations, mobile communication devices (e.g., mobile phones, smartphones, tablet computers, wearable devices), satellite bases stations, satellite radios, computer network devices (e.g., servers, routers, wireless network access points or wireless network routers), computers (e.g., laptop or desktop computers), Internet of Things (IoT) devices, computer peripheral devices (e.g., plug and play devices), near-field communication transceivers, broadcast and/or cablecast network devices (e.g., cable television receivers), broadband/cable modems, communication devices autonomous vehicle communications (e.g., self-driving vehicles, unmanned aerial vehicles (UAV)), etc.

Figure 2:
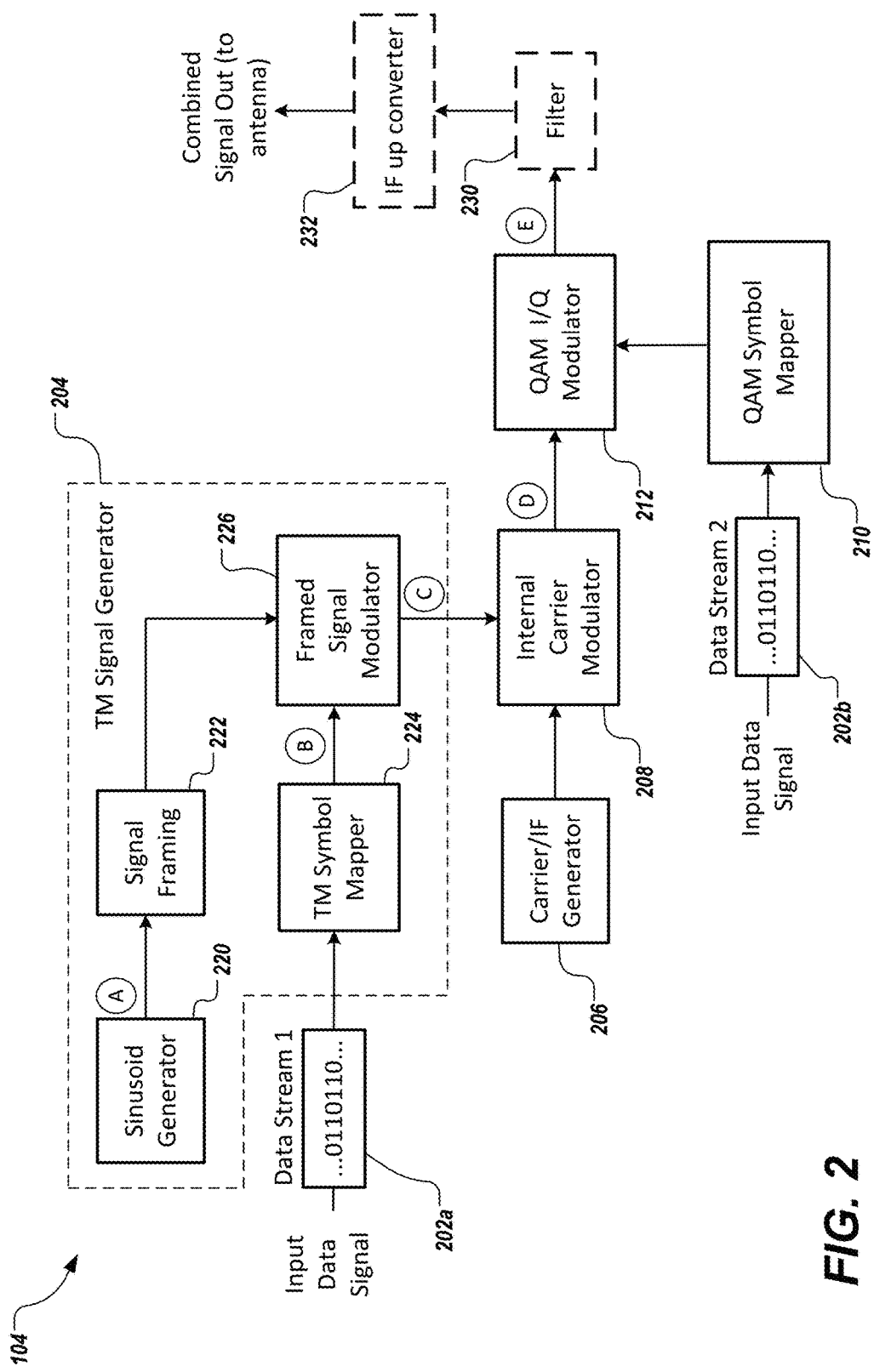
FIG. 2 depicts a block diagram of a representative TM signal transmitter in accordance with implementations of the present disclosure.

FIG. 2 depicts a block diagram of a representative TM signal transmitter 104 in accordance with implementations of the present disclosure. TM transmitter 104 is an integrated TM transmitter. That is, TM transmitter 104 is integrated with non-TM transmitter components. TM transmitter 104 can be implemented in hardware (e.g., as integrated circuits, chip-sets, application specific integrated circuits (ASIC) or field programmable logic arrays (FPGA)) or in software (e.g., as a software defined radio (SDR)). TM transmitter 104 includes several component modules which are described in more detail below.

For simplicity of discussion, TM transmitter 104 is illustrated and described in the context of combining a TM signal with a QAM signal. However, TM transmitter 104 may be configured to combine TM with other non-TM modulation types including, but not limited to, AM, FM, PM, QPSK, APSK, DPSK, or FSK. That is, for example, in some implementations, QAM components 210 and 212 may be replaced by or supplemented with corresponding modulation components for performing PSK modulation. In some implementation, for example, TM transmitter 104 can include multiple sets of non-TM modulation components. TM transmitter 104 can configured to select between combining TM signals with any of the configured non-TM types of modulation. For example, a processor can be used to select between several non-TM signal types for combination with a TM signal based criteria including, but not limited to, communication channel conditions (e.g., noise, error rate, etc.), capabilities of a receiving device (e.g., which non-TM signals a receiver is capable of receiving), a priority of the data to be sent, a size of the data to be sent or a type of the data to be sent.

As a whole, TM transmitter 104 receives multiple input data signals and processes the data signals for transmission on a common carrier using both a TM signal and a non-TM signal. TM transmitter 104 receives input data signals 202a, 202b (data stream 1 and data stream 2). The input data signals 202a, and 202b are intended for transmission to one or more receivers. In the illustrated implementation, TM transmitter 104 modulates a carrier signal with data from data stream 1 using TM modulation and modulates the same carrier with data from data stream 2 using QAM modulation. Data stream 1 and data stream 2 can be two independent data streams. TM transmitter 104 may thus increase the data throughput of system by sending two data signal on the same carrier. Thus, TM transmitter 104 may provide, in a sense, modulation division multiple access by separately transmitting two independent data signals 202a, 202b simultaneously on a single carrier using separate TM and QAM signals.

TM transmitter 104 uses a technique referred to herein as "internal TM modulation" to generate the TM signal. As will be described in more detail below, internal TM modulation involves encoding data from an input data stream 202a within discrete phase shifts or time shifts of an internal modulation signal (also referred to as an "internal TM signal" or simply the "TM signal" in reference to internal TM modulation). The internal TM signal is periodic signal, for example, a sinusoid or other periodic signal. The internal TM signal has a frequency that is related to the symbol frame (e.g., symbol period and symbol rate) of the non-TM signal with which the TM signal will be combined. For example, the internal TM signal can have a frequency that is an integer multiple of the symbol rate of the non-TM signal.

TM transmitter 104 modulates a carrier signal with the TM signal by applying the internal TM signal to the carrier signal. Internal TM modulation differs from traditional phase modulation in that the phase of the carrier signal is not directly modulated or altered based on the input data signal. Instead, the internal TM signal is modulated with the data signal and the entire sinusoidal internal TM signal is applied to the carrier by, for example, inserting the entire sinusoidal internal TM signal into the phase or frequency of the carrier signal. The data of the data signal 202a is encoded in a phase or time shift of the internal TM signal and not directly in the carrier. Moreover, because the internal TM signal is periodic, variations in the phase of the carrier caused by the internal TM signal are averaged out over an integer number cycles of the internal TM signal (discussed in more detail below in reference to FIGS. 3B and 6). In some implementations, TM symbols can be constructed so that the internal TM signal averages out over an integer number of half-cycle of the internal TM signal.

In more detail, TM transmitter 104 includes several modules, each of which can be implemented in hardware or software. For example, each of the modules can be implemented in hardware as an integrated circuit, a chip-set, an ASIC, FPGA, as a software module (e.g. one or more code blocks), or a combination thereof. TM transmitter 104 includes a TM signal generator (TM-SG) 204, a carrier generator 206, an internal carrier modulator 208, a QAM symbol mapper 210, and a QAM I/Q modulator 212.

TM-SG 204 generates the internal modulation signal. The TM-SG 204 includes a signal generator 220, a signal framing module 222, a TM symbol mapper 224, and a framed signal modulator 226. Signal generator 220 generates a periodic signal which will be modulated to provide the internal modulation signal. For example, signal generator 220 is described herein as generating a sinusoidal signal. However, in other implementations, different periodic signals can be used to produce the internal modulation signal as described herein.

Figure 3B:
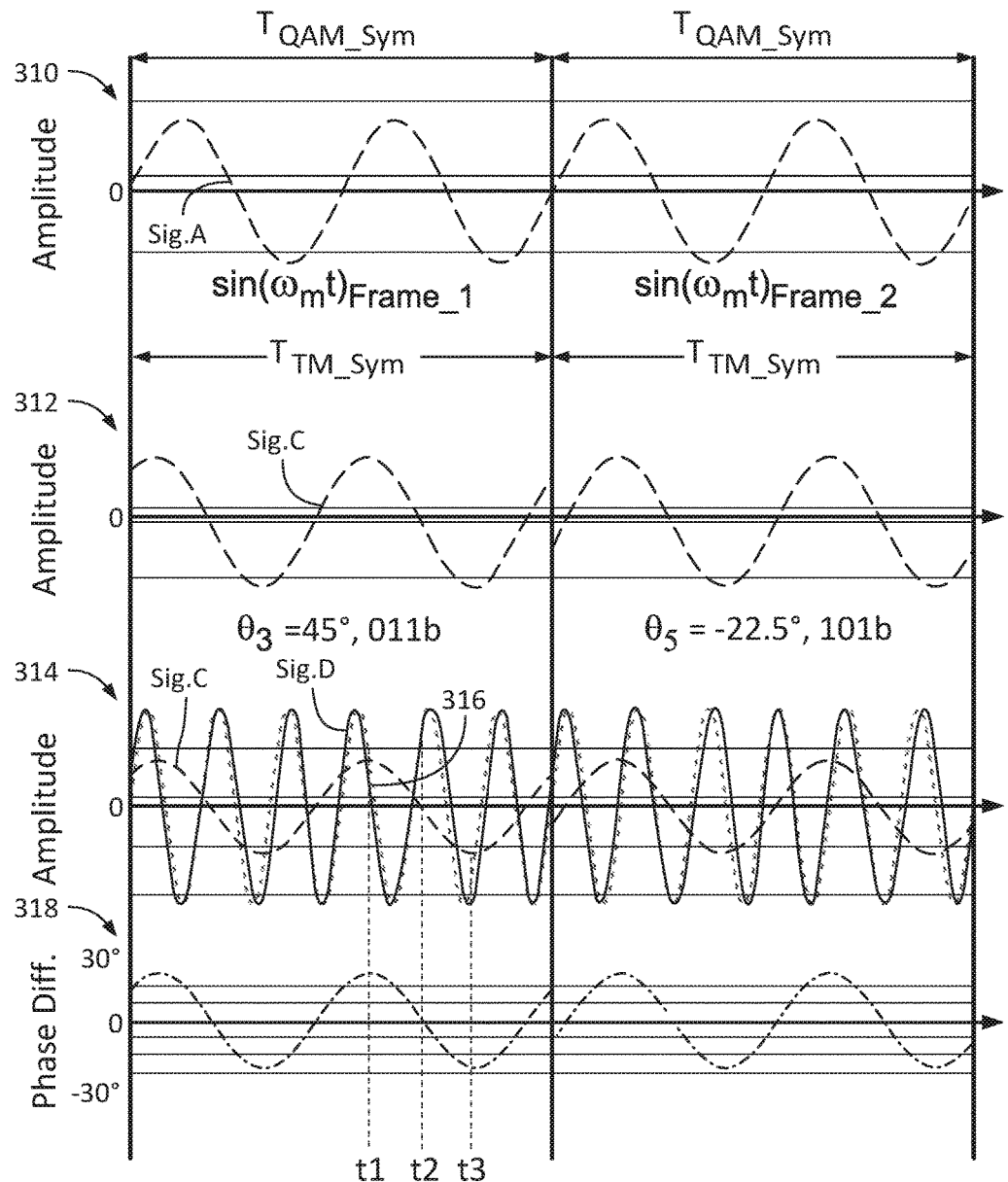
FIGS. 3B-3G depicts graphs of representative signals produced at various stages within the TM transmitter of FIG. 2.

The sinusoidal signal can be represented generally as $\sin(\omega_m t)$, where $\omega_m = 2\pi f$. The frequency, f, of the sinusoidal signal is related to the symbol rate of the QAM signal which the TM signal will be combined. A representative output (signal A) of signal generator 220 is illustrated in graph 310 of FIG. 3B. For example, the frequency of the sinusoidal signal (signal A) can be, approximately, an integer multiple of the symbol rate of the QAM symbols generated by the QAM symbol mapper 210 and QAM I/Q modulator 212. Thus, an integer number of cycles of the sinusoidal signal (signal A) are present each QAM symbol period ($T_{QAM\_Sym}$). For example, as shown in FIG. 3B, approximately two cycles of the sinusoidal signal (signal A) are present in each QAM symbol period (e.g., the frequency of the Signal A in FIG. 3B is approximately twice the QAM symbol rate).

Signal framing module 222 divides the sinusoidal signal into frames. The frames of the sinusoidal signal represent portions of the sinusoidal that will be discretely phase or time shifted to generate the internal TM modulation signal. The framed portions of the sinusoidal signal also represent the symbol period of TM symbols ($T_{TM\_Sym}$). For example, graph 310 of FIG. 3B illustrates signal A separated into frames. The framed signal can be represented by $\sin(\omega_m t)_{Frame}$, where $\sin(\omega_m t)_{Frame} = \sin(\omega_m t)$; from the start of a frame $t=t_{F\_start}$ to the end of a frame $t=t_{F\_end}$. Signal framing module 222 can synchronize the framing of the sinusoidal signal such that each frame includes an integer number of cycles of the sinusoidal signal. In other words, signal framing module 222 times the frames such that the TM symbol period corresponds with an integer multiple of the period of the sinusoidal signal generated by signal generator 220. Graph 310 of FIG. 3B illustrates frame 1 and frame 2 as including two cycles of sinusoidal signal A. The TM symbol periods may include any integer number of cycles of the sinusoidal signal. Moreover, as described below and illustrated in FIGS. 3D and 3E, the TM symbol frames need not be the same length as the QAM symbol periods (as shown in FIG. 3B). The TM symbol frames may be shorter or longer than the QAM symbol periods.

TM symbol mapper 224 maps the data from input data 202a to TM symbols of a TM symbol constellation. The TM symbols can be represented by different discrete phase shifts in each frame of the sinusoidal signal generated by signal generator 220. For example, the output (Signal B) of TM symbol mapper 224 is a phase shift value ($\theta_i$) that represents the value of a set of binary digits. FIG. 3A depicts a chart 300 of an exemplary symbol map for TM symbols. Chart 300 shows a mapping of eight three-bit TM symbols. Each three-bit set of binary data corresponds to a discrete phase shift (e.g., $\theta_0$-$\theta_7$) of the sinusoidal signal (e.g., signal A). The illustrated TM symbol constellation is an 8-TM constellation; similar to an 8-PSK constellation. Although an 8-TM constellation size is shown, implementations can use N-ary TM constellation sizes that are larger or smaller than 8 symbols. For example, TM constellation sizes include 4-TM, 16-TM, 64-TM, 256-TM, or larger. The difference between phases $\theta_0$-$\theta_7$ represents the symbol spacing ($\Delta\theta$) for the TM constellation. The total range for the phase shifts (e.g., symbol space) can be from $\pi$ to $-(\pi-\Delta\theta)$.

Framed signal modulator 226 generates the internal modulation signal (e.g., TM signal). Framed signal modulator 226 modulates the sinusoidal signal (signal A) by applying an appropriate phase shift to each frame of the sinusoidal signal to represent data from the input data signal 202a. For example, framed signal modulator 226 receives phase shift data from TM symbol mapper 224 and shifts the phase of a respective frame of the sinusoidal signal by a corresponding amount to accurately represent data from the input data signal 202a. The output of framed signal modulator 226 (signal C) is the internal TM signal.

For example, graph 312 of FIG. 3B illustrates a representative internal TM signal (signal C). Signal C is shown directly below the unmodulated sinusoidal signal (signal A) to clearly illustrate the discrete phase shifts in signal C. The first TM symbol (frame 1 of signal C) is shifted by 45° to represent the binary value 011b. The second TM symbol (frame 2 of signal C) is shifted by −22.5° to represent the binary value 101b. As seen in signal C, because the TM symbol period is an integer multiple of the period of signal A, the average value of signal C during each frame remains zero.

Each frame of the internal TM signal can be represented generally as $\Phi_{TM}(t)=\varepsilon \sin(\omega_m t+\theta_k)$, where $\Phi_{TM}(t)$ represents the internal TM signal, $\theta_k$ represents the phase shift of the k-th frame TM symbol, and $\varepsilon$ is a TM modulation index. The TM modulation index, $\varepsilon$, is set to a maximum value of less than $\pi$ (e.g., $\pi/2$) to avoid over modulation of the carrier's phase. Furthermore, the modulation index, phase shift values $\theta_k$, or both can be adjusted to control side lobes of the TM modulation when applied to the carrier signal. For example, the modulation index can be adjusted to control the spectrum of the TM signal such that it fits within a passband of a given communication channel. An internal TM signal that includes a set of N symbol frames can be represented generally as a sum of the N frames of TM symbols from k=0 to N; $\Phi_{TM}(t)=\Sigma_{k=0}^{N}[\varepsilon\sin(\omega_m t+\theta_k)]_{Frame\_k}$.

Internal carrier modulator 208 applies the internal TM signal to the carrier signal by inserting the internal TM signal into the phase of a carrier signal. Internal carrier modulator 208 receives a carrier signal from carrier generator 206. Carrier generator 206 produces a carrier or IF signal that will be used to transmit the TM signal and the QAM signal. The carrier signal is represented generally as A $\sin(\omega_c t)$, where A represents the amplitude of the carrier and $\omega_c$ represents the angular frequency of the carrier. Internal carrier modulator 208 inserts the internal TM signal into the phase of the carrier signal and outputs a TM modulated carrier signal (signal D). For example, the TM modulated carrier signal can be represented generally as $V_{TM}(t)=A\sin(\omega_c t+\Phi_{TM}(t))$. In some implementations, the internal TM signal can be inserted into the frequency of the carrier signal. For example, internal carrier modulator 208 can insert the internal TM signal into the frequency of the carrier signal. In such implementations, the TM modulated carrier signal can be represented generally as $V_{TM}(t)=A\sin((\omega_c+\Phi_{TM}(t))t)$.

In some implementations, such as when the TM signal is combined with a QAM signal the carrier is a complex carrier. In such implementations, the TM modulated carrier can be represented generally as $V_{TM}(t)=A\,e^{(i\omega_c t+\Phi_{TM}(t))}$. In practice, a complex carrier signal may be generated as a pair of real sinusoidal signals with an orthogonal phase relationship; an in-phase cosine carrier and a quadrature-phase negative cosine carrier). In such implementations, internal carrier modulator 208 inserts the internal TM signal into the phase of one or both of the I/Q carrier signals.

Graph 314 of FIG. 3B provides an example of a TM modulated carrier signal (signal D). For illustrative purposes, an unmodulated carrier signal 316 and internal TM signal (signal C) are superimposed over TM modulated carrier signal (signal D). In addition, graph 318, just below graph 314, is a plot of the time varying phase difference between the TM modulated carrier signal (signal D) and the unmodulated carrier signal 316. As illustrated in graphs 314 and 318, the TM modulated carrier signal (signal D) alternates between leading the unmodulated carrier signal 316 (at time $t_1$), being in completely phase with the unmodulated carrier signal 316 (at time $t_2$), and lagging the unmodulated carrier signal 316 (at time $t_3$) by equivalent phase shifts. This occurs twice within each QAM symbol period in the illustrated example. Consequently, the time-averaged phase difference between the TM modulated carrier signal (signal D) and the unmodulated carrier signal 316 is zero for each QAM symbol period.

Figure 3C:
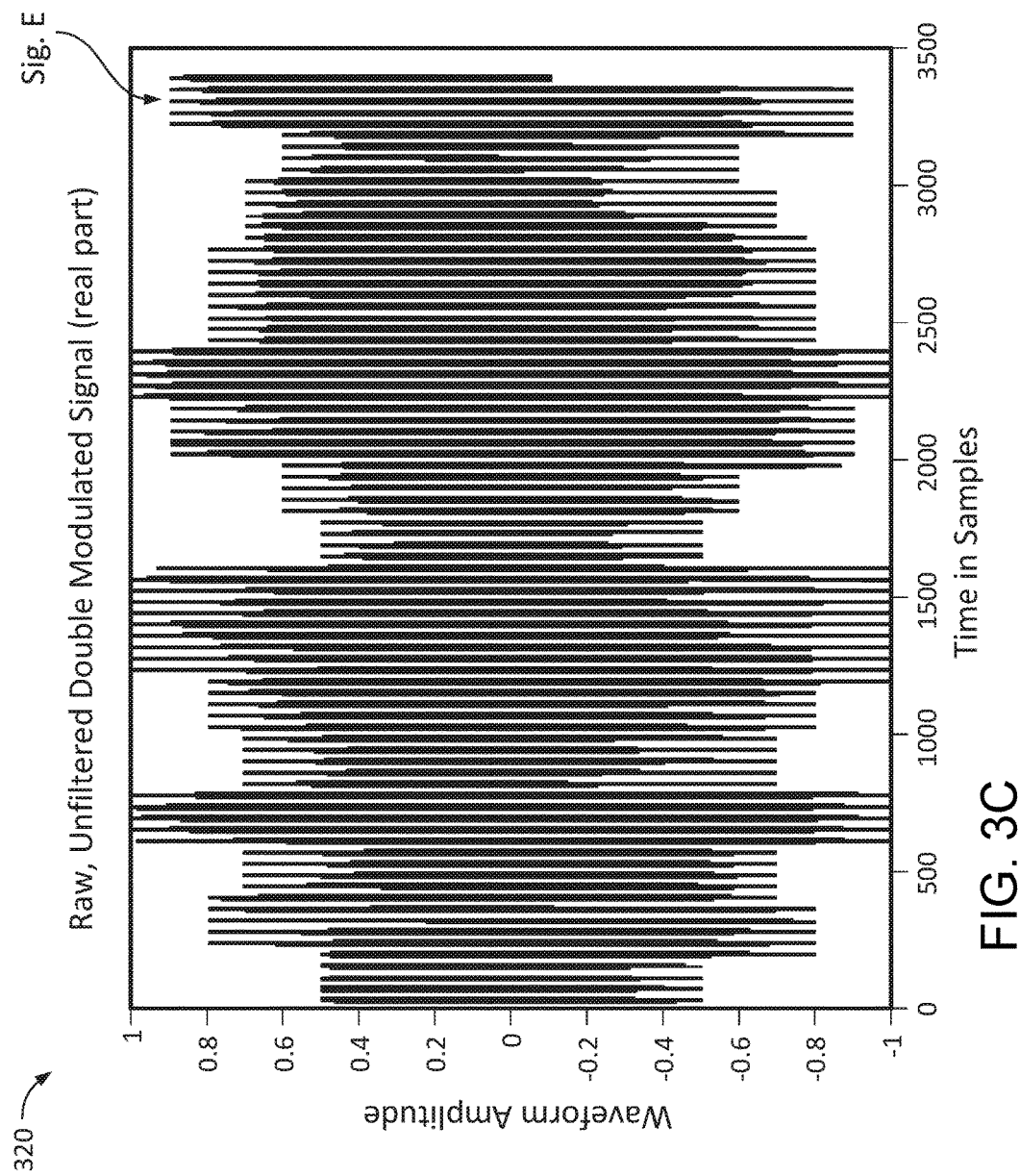

QAM symbol mapper 210 receives input data 202b from data stream 2 and maps the input data 202b to QAM symbols. QAM symbol mapper 210 outputs a baseband QAM signal that can be represented generally as $Q(t)=|Q_n|e^{i\Psi_n}$, where $|Q_n|$ represents the magnitude of the n-th frame QAM symbol and $e^{i\Psi_n}$ represents the phase of the n-th frame QAM symbol. QAM carrier modulator 212 modulates the TM modulated carrier signal (signal D) with the QAM symbols. QAM modulator 212 outputs a combined signal (signal E) that includes the carrier signal modulated with both the TM and QAM signals. The combined signal can be represented generally as $V_{comb.}(t)=Q(t)\,A\,e^{(i\omega_c t+\Phi_{TM}(t))}$. The combined signal ($V_{comb.}$) has a constant complex value over a QAM symbol frame, which is representative of one of N such values in a QAM constellation, as selected by QAM symbol mapper 210. Graph 320 of FIG. 3C provides an example of a combined TM and QAM modulated carrier signal (signal E). Graph 320 shows the real magnitude of a combined TM and QAM modulated carrier signal. As discussed above, phase shifts of the carrier due to the internal TM signal are canceled over the symbol period of the QAM signal, and thus, have a minimal impact on the recoverability of the QAM signal.

Filter 230 is a transmit filter that filters the combined signal to meet the constraints of a given transmission channel. For example, filter 230 can be a band pass filter that matches the pass-band of the transmission channel.

IF up converter 232 is included in transmitters 104 that generate the combine signal at an intermediate frequency. IF up converter 232 upshifts the combined signal from the intermediate frequency to a carrier frequency.

While transmitter 104 has been described as modulating a carrier signal with TM first and then modulating the TM modulated carrier with QAM, in some implementations the order of modulation may be reversed. For example, a carrier signal can be modulated with QAM first and the QAM modulated carrier can be subsequently modulated with the internal TM signal. That is the internal carrier modulator 208 can insert the internal TM signal into the phase of a complex carrier that is already modulated with a QAM signal.

As noted above, the TM symbol frame need not be the same length as the QAM symbol periods (as shown in FIG. 3B). In other words, the TM and QAM symbol rates can be different. In general, when the frequency of sinusoidal signal used to generate the internal TM signal is related to the QAM symbol rate (e.g., as opposed to being a harmonic of the carrier signal as noted above), then the TM symbol period should generally be an integer multiple of the period of the sinusoidal signal. Setting the TM symbol period as an integer multiple of the period of the sinusoidal signal aids in preventing interference between the TM and QAM signal and, thereby, maintaining the transparency between the signals.

Figure 3D:
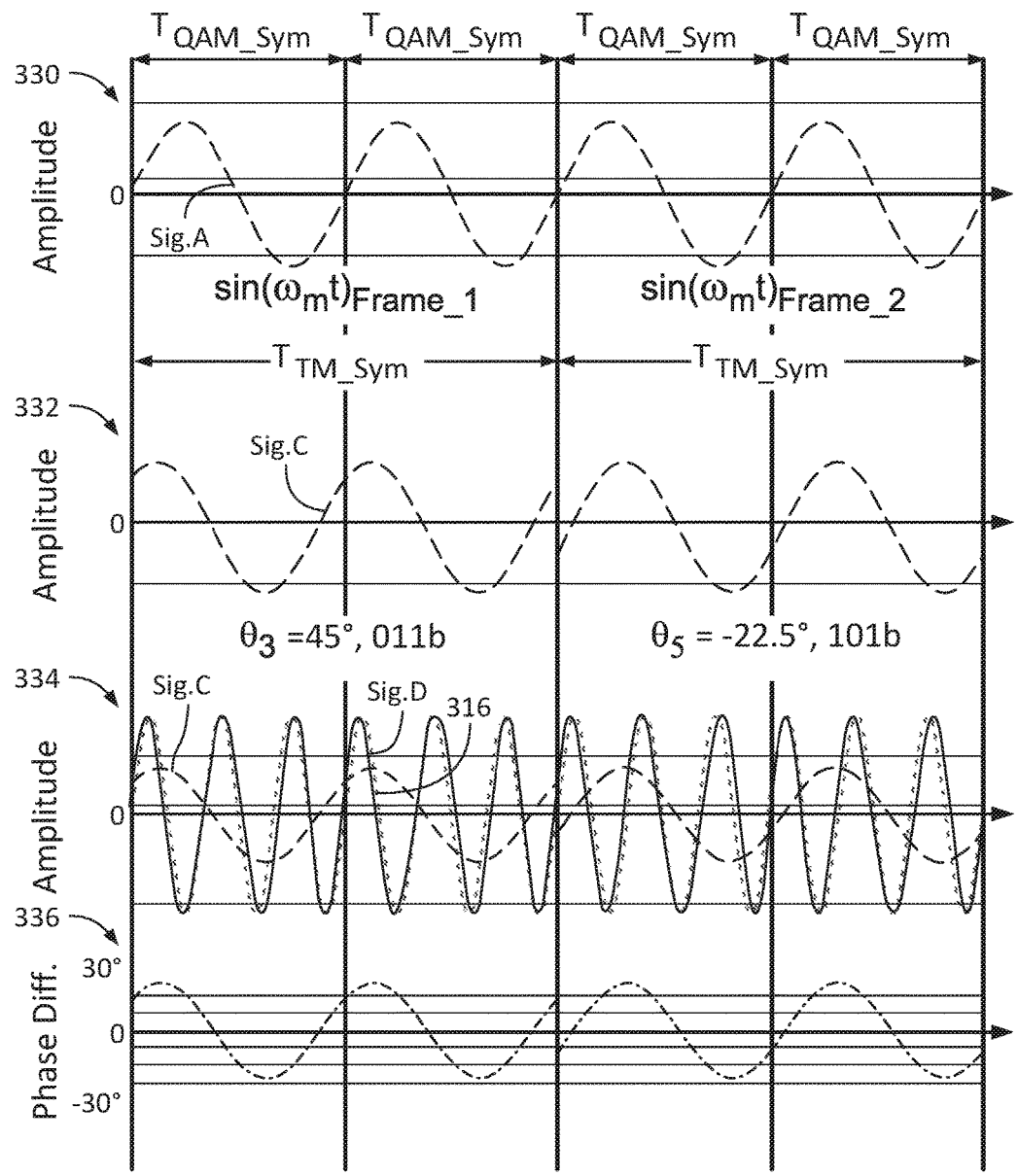

For example, FIG. 3D shows graphs 330-336 which illustrate a TM signal in which the TM symbol period is longer than the QAM symbol period, or, in other words, the TM symbol rate is lower than the QAM symbol rate. Graph 330 illustrates that the sinusoidal signal (signal A) has one cycle per QAM symbol. The TM symbol frames 1 and 2 of the internal TM signal (signal C) are twice the length of the QAM symbols, and thus, half of the symbol rate. Yet, as illustrated in graphs 334 and 336 the phase variations introduced into the TM modulated carrier signal (signal D) will still average to zero over each of the QAM symbol periods.

Figure 3E:
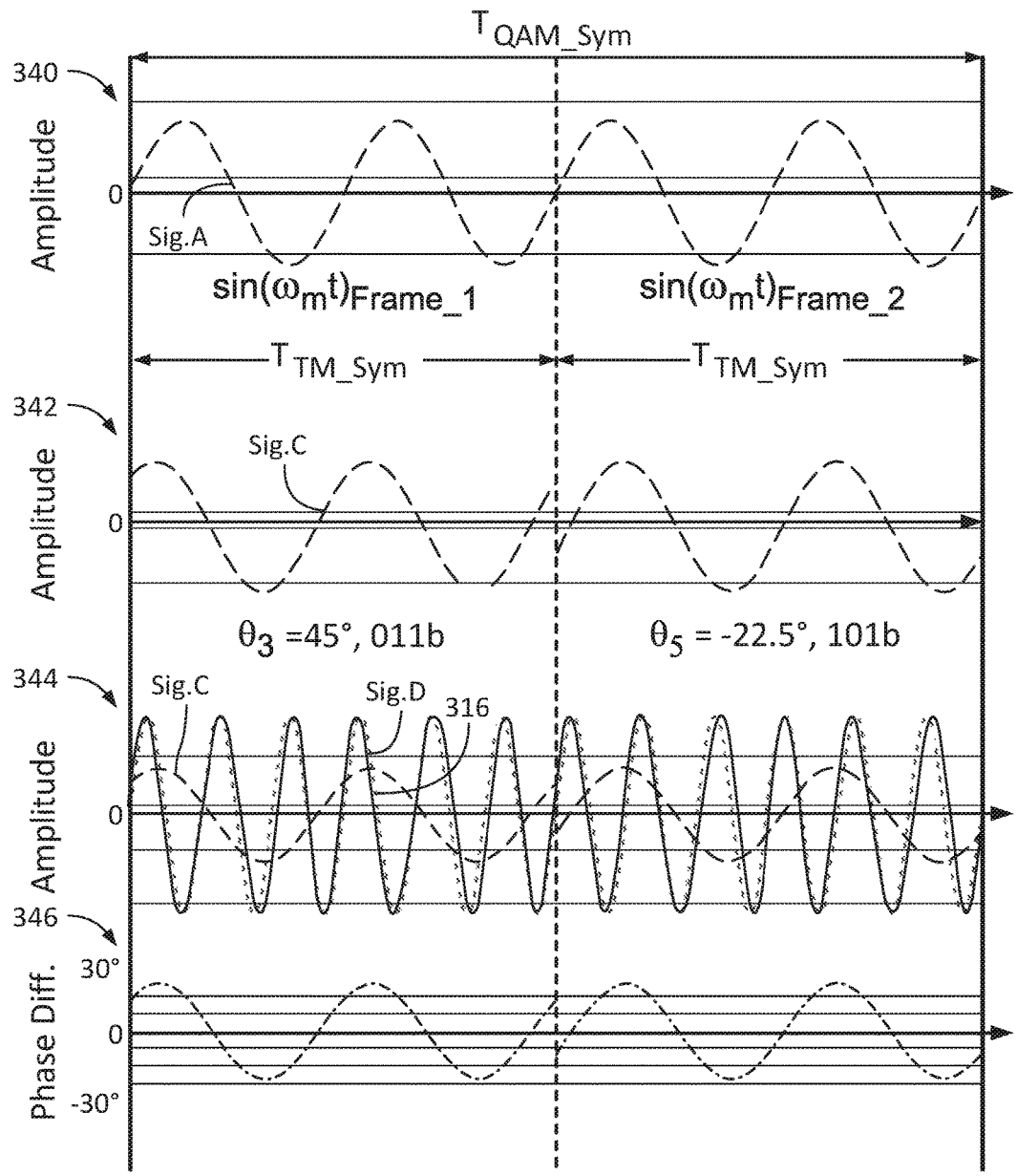

As another, FIG. 3E shows graphs 340-346 which illustrate a TM signal in which the TM symbol period is shorter than the QAM symbol period, or, in other words, the TM symbol rate is higher than the QAM symbol rate. Graph 340 illustrates that the sinusoidal signal (signal A) has four cycles per QAM symbol. The TM symbol frames 1 and 2 of the internal TM signal (signal C) are half the length of the QAM symbols, and thus, twice the symbol rate. Still, as illustrated in graphs 344 and 346 the phase variations introduced into the TM modulated carrier signal (signal D) will still average to zero over each of the QAM symbol periods.

In some implementations, the information carrying capacity of the TM signal can be increased by encoding data in amplitude shifts of the internal TM signal in addition to phase shifts. TM symbol mapper 224 can represent TM symbols by different combinations of a phase shifts and amplitude shifts of the sinusoidal signal generated by signal generator 220, thus, expanding the TM symbol constellation. For example, the TM modulation index, $\varepsilon$, can be shifted to add an amplitude shift component to the TM symbol set. Chart 302 of FIG. 3A illustrates an example set of TM symbols that incorporate both amplitude and phase shifts to represent data. In chart 302 $\varepsilon_0$ and $\varepsilon_1$ represent two amplitude levels (e.g., $\pi/6$ and $\pi/12$). Framed signal modulator 226 then modulates the sinusoidal signal (signal A) by applying an appropriate combination of phase shift and amplitude shift to each frame of the sinusoidal signal to represent data from the input data signal 202a and to, thereby, generate the internal TM signal (signal C). Each frame of the internal TM signal can be represented generally as $\Phi_{TM}(t)=\varepsilon_k \sin(\omega_m t+\theta_k)$, where $\varepsilon_k$ represents the amplitude shifted modulation index for the k-th frame TM symbol.

Figure 3F:
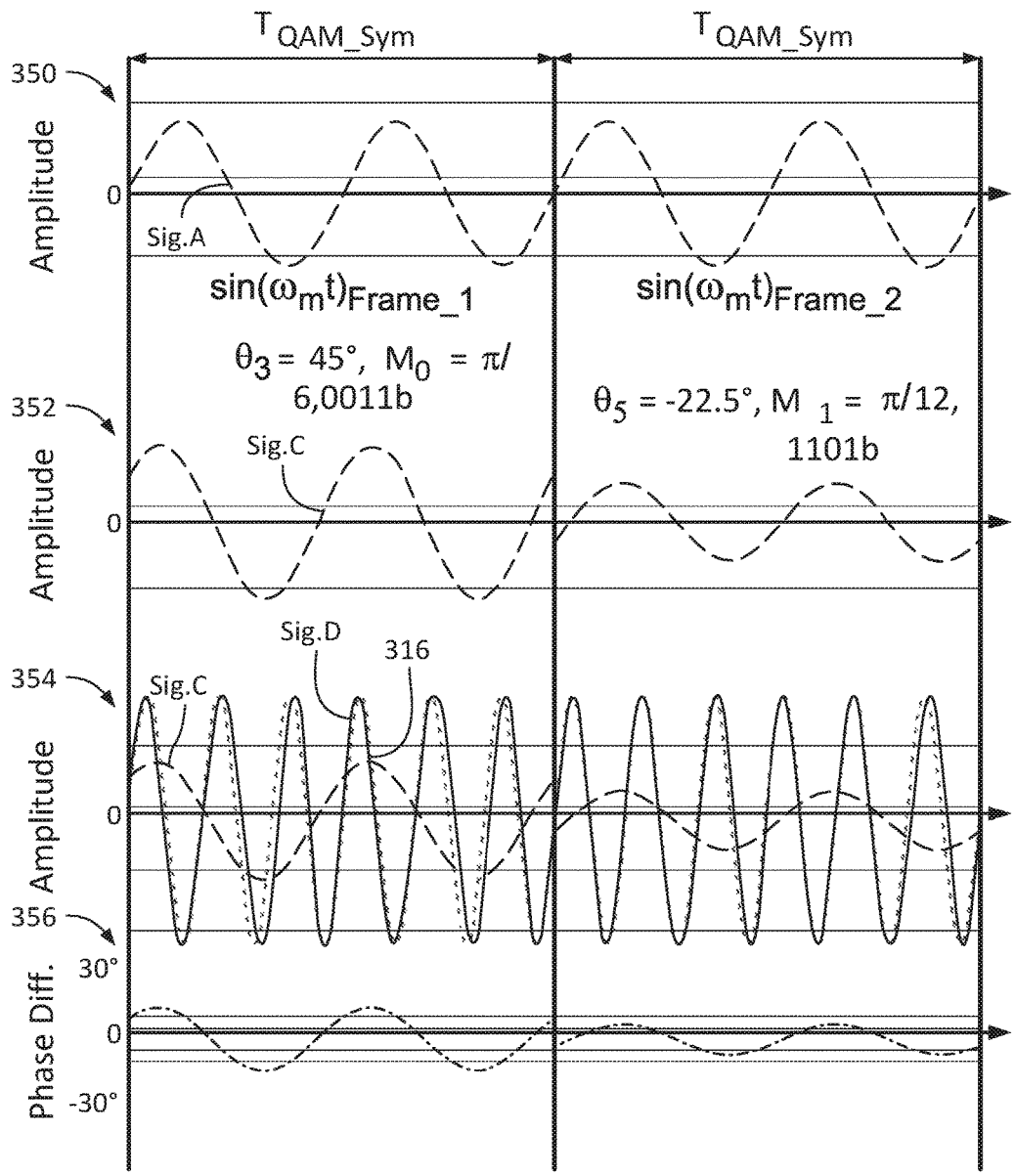

For example, FIG. 3F shows graphs 350-356 which illustrate a TM signal in which the TM symbols are represented by a combination of shifts in phase and amplitude (e.g., TM modulation index). Graph 350 illustrates that the sinusoidal signal (signal A) has two cycles per QAM symbol. As shown in graph 352, the first TM symbol (frame 1 of signal C) is represented by a phase shift by 45° of the sinusoidal signal (signal A) and a modulation index value of $\pi/6$ to represent the binary value 0011b. The second TM symbol (frame 2 of signal C) is represented by a phase shift by −22.5° of the sinusoidal signal (signal A) and a modulation index value of $\pi/12$ to represent the binary value 1101b. Yet, as illustrated in graphs 354 and 356 the phase variations introduced into the TM modulated carrier signal (signal D) will still average to zero over each of the QAM symbol periods. However, due to the smaller modulation index value of the second TM symbol, the TM modulated carrier signal (signal D) in frame 2 exhibits less phase variation.

Figure 3G:
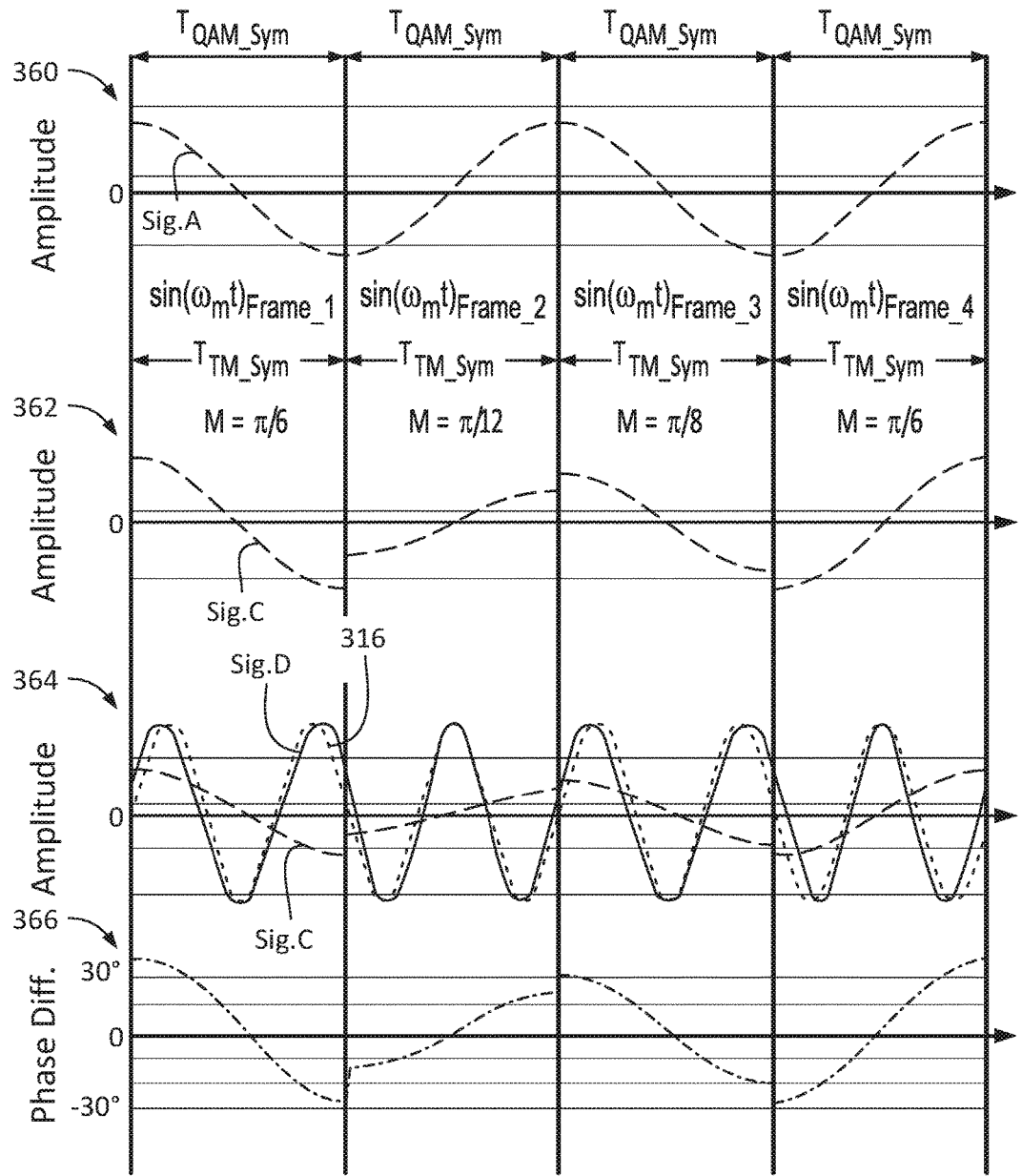

In some implementations, TM symbols can be represented by half-cycles of the sinusoidal signal (signal A). For example, a half-cycle TM symbol can be constructed so as to average to zero within each non-TM symbol frame by synchronizing the sinusoidal signal with the non-TM symbol frames such that the non-TM symbol frame includes approximately equal positive and negative quarter cycles of the sinusoidal signal. For example, a cosine signal that is synchronized with the non-TM symbol frames can be used as the sinusoidal signal (signal A), as illustrated in FIG. 3G. In such implementations, data can be encoded in the amplitude shifts of the internal TM signal. TM symbol mapper 224 can represent TM symbols by different combinations amplitude shifts of the sinusoidal signal generated by signal generator 220. For example, the TM modulation index, $\varepsilon$, can be shifted to encode data in an amplitude shift of the internal TM signal. Framed signal modulator 226 then modulates the sinusoidal signal (signal A) by applying an appropriate amplitude shift to each frame of the sinusoidal signal to represent data from the input data signal 202a and to, thereby, generate the internal TM signal (signal C). Each frame of the internal TM signal can be represented generally as $\Phi_{TM}(t)=\varepsilon_k \cos(\omega_m t)$, where $\varepsilon_k$ represents the amplitude shifted modulation index for the k-th frame TM symbol.

For example, FIG. 3G shows graphs 360-366 which illustrate a TM signal in which the TM symbols are represented by amplitude (e.g., TM modulation index) shifts in half-cycles of the sinusoidal signal. Graph 360 illustrates that the sinusoidal signal (signal A) has one half-cycle per QAM symbol. Graph 360 also illustrates the sinusoidal signal divided into four TM symbols (TM frames 1-4), each of which includes one half-cycle of the sinusoidal signal (signal A). As shown in graph 362, the first TM symbol (frame 1 of signal C) is represented by an amplitude modulation index value of $\pi/6$. The second TM symbol (frame 2 of signal C) is represented by an amplitude modulation index value of $\pi/12$. The third TM symbol (frame 3 of signal C) is represented by an amplitude modulation index value of $\pi/8$. And, the fourth TM symbol (frame 4 of signal C) is represented by an amplitude modulation index value of $\pi/6$. Yet, as illustrated in graphs 364 and 366 the phase variations introduced into the TM modulated carrier signal (signal D) will still average to zero over each of the QAM symbol periods. The effect of the positive quarter-cycle of each TM symbol on the TM modulated carrier signal (signal D) effectively cancels with corresponding negative quarter-cycle.

FIG. 3G serves as an example of how an internal TM signal can be composed of half-cycles of a periodic signal. However, such implementations are not limited to only one half-cycle per TM symbol frame, but can include an integer number of half-cycles per TM symbol frame. Similarly, such implementations are also not limited to only one half-cycle per non-TM symbol frame (or only one TM symbol per non-TM symbol), but can include an integer number of half-cycles per non-TM symbol frame or an integer number of TM symbols per non-TM symbol frame.

In some implementations, TM transmitter 104 synchronizes the phase of sinusoidal signal (signal A) with non-TM symbols. For example, signal generator 220 can generate the sinusoidal signal (signal A) such that it is synchronized with the symbol frame period of the non-TM signal. In such implementations, the changes in the symbols of the non-TM signal can serve as a synchronization signal at the receiver for detecting the TM symbols. In such implementations, the changes in the symbols of the non-TM signal can serve as a synchronization signal at the receiver for demodulating the TM signal. In some implementations, TM transmitter 104 can generate the sinusoidal signal (signal A) as a harmonic of the carrier signal.

In some implementations, TM transmitter 104 synchronizes the phase of sinusoidal signal (signal A) with the phase of a carrier signal. For example, signal generator 220 can generate the sinusoidal signal (signal A) such that it is in phase with the carrier signal generated by carrier generator 206. In such implementations, the carrier can serve as a synchronization signal at the receiver for demodulating the TM signal. In some implementations, TM transmitter 104 can generate the sinusoidal signal (signal A) as a harmonic of the carrier signal.

In some implementations, TM transmitter 104 can adjust the data rates of one or both of the TM and QAM signals. For example, TM transmitter 104 dynamically control the TM symbol mapper 224, the QAM symbol mapper 210, or both to adjust the respective TM or QAM constellations (e.g., bits/symbol) to account for changes in the transmission channel conditions. For example, if channel noise increases, TM transmitter 104 can control one or both of the symbol mappers 224, 210 to contract the respective symbol constellation and decrease the number of bits/symbol. By contrast, if channel noise decrease, TM transmitter 104 can control one or both of the symbol mappers 224, 210 to expand the respective symbol constellation and increase the number of bits/symbol.

In some implementations, transmitter 104 can transmit the TM modulated signal without adding the QAM signal. For example, transmitter 104 can be configured to selectively turn QAM I/Q modulator 212 on and off. Similarly, transmitter 104 can be configured to selectively turn internal carrier modulator 208 on and off. If, for example, the combined data rate of TM and QAM signals is not needed transmitter 104 can select to transmit data using either a TM signal or a QAM signal alone.

In some implementations, carrier generator 206 can be a hardware oscillator. In some implementations, carrier generator 206 can be a software module that generates a carrier or local oscillator signal. In some implementations, carrier generator 206 may be separate from transmitter 104. For example, transmitter 104 can receive a carrier signal can from an external oscillator or clock.

In some implementations, the QAM modulator 212 can be located before the internal carrier modulator 208. For example, the QAM modulator 212 can modulate the carrier signal with the QAM signal before internal carrier modulator 208 applies the internal TM signal to the carrier signal. In such implementations, internal carrier modulator 208 can receive the QAM modulated carrier signal and, using techniques described above, insert the internal TM signal into the QAM modulated carrier signal. In other words, internal carrier modulator 208 can be configured to insert the internal TM signal into an unmodulated carrier signal or into a carrier signal that is modulated with a non-TM signal (e.g., traditional modulation signal).

Figure 4:
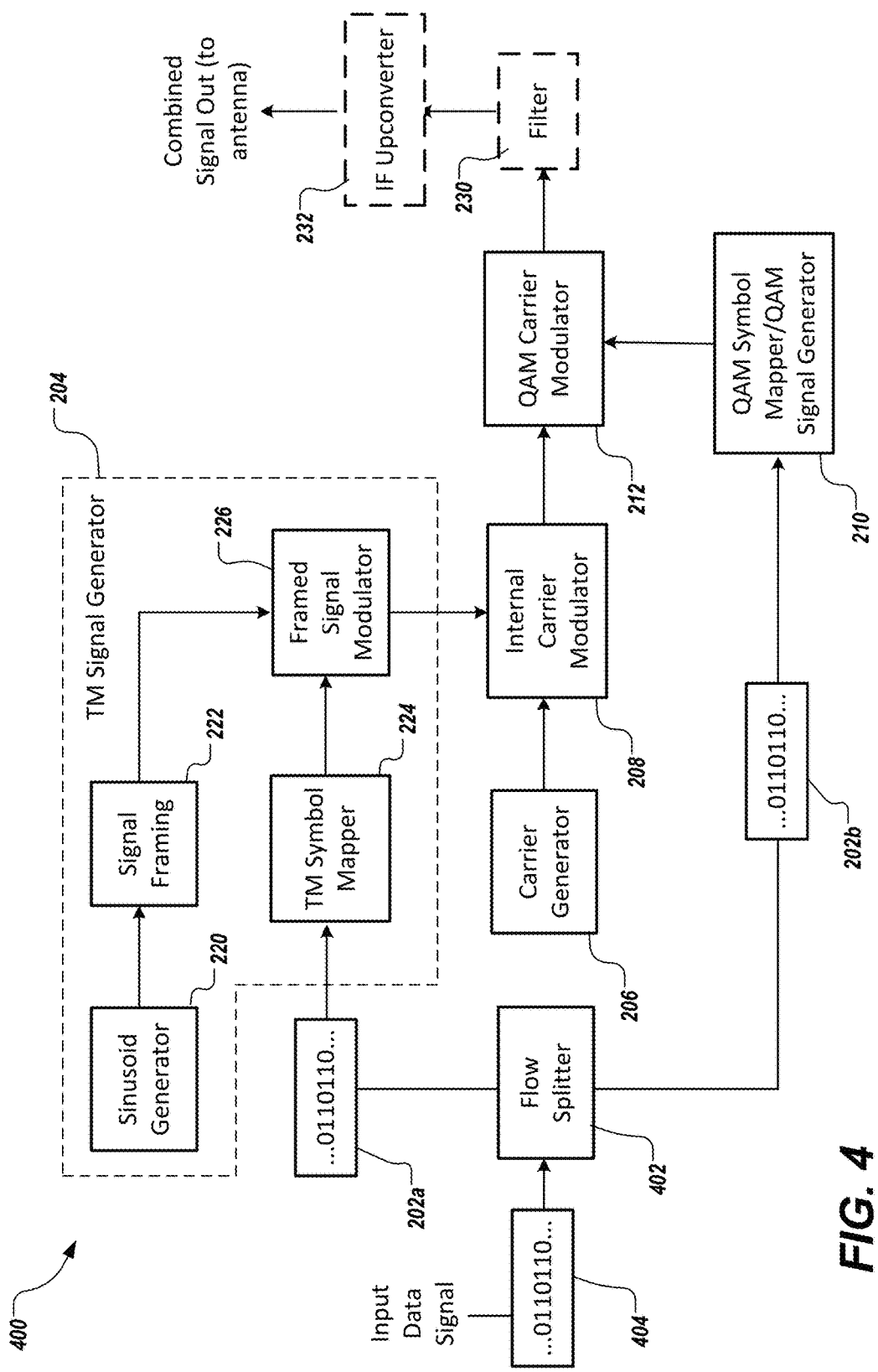
FIG. 4 depicts a block diagram of another representative TM signal transmitter in accordance with implementations of the present disclosure.

FIG. 4 depicts a block diagram of another representative TM transmitter 400 in accordance with implementations of the present disclosure. TM transmitter 400 is similar in operation to transmitter 104. However, instead of transmitting two independent data streams, one as a TM signal and another as a QAM signal, TM transmitter 400 splits data stream 404 to transmit a first portion 202a of the data stream 404 as a TM signal and a second portion 202b of the data stream 404 as a QAM signal. TM transmitter 400 includes a data flow splitter 402 that splits the input data stream 404 into two portions 202a, 202b and feeds one portion 202a to the TM portion of the transmitter and the other portion 202b to the QAM portion of the transmitter 400. Data flow splitter 402 can apportion the input data stream based on the individual data rates of the TM and QAM signals. For example, if the data rate of the TM signal is greater than that of the QAM signal, data flow splitter 402 can apportion a greater portion of the data from data stream 404 to data stream 202a which is sent to the TM signal processing components of TM transmitter 400. TM transmitter 400 may thus increase the data throughput of a single data link by applying the increase in data throughput gained by the combined TM/QAM signal to a single data stream 404.

In some implementations, data flow splitter 402 can be dynamically controlled to adjust the apportionment of data between the TM and QAM signals. For example, if transmitter 400 changes symbol constellation of one or both of the modulation signals due to channel conditions, TM transmitter 400 can adjust the apportionment of data between the TM and QAM signals to account for the corresponding changes in data rate.

Figure 5:
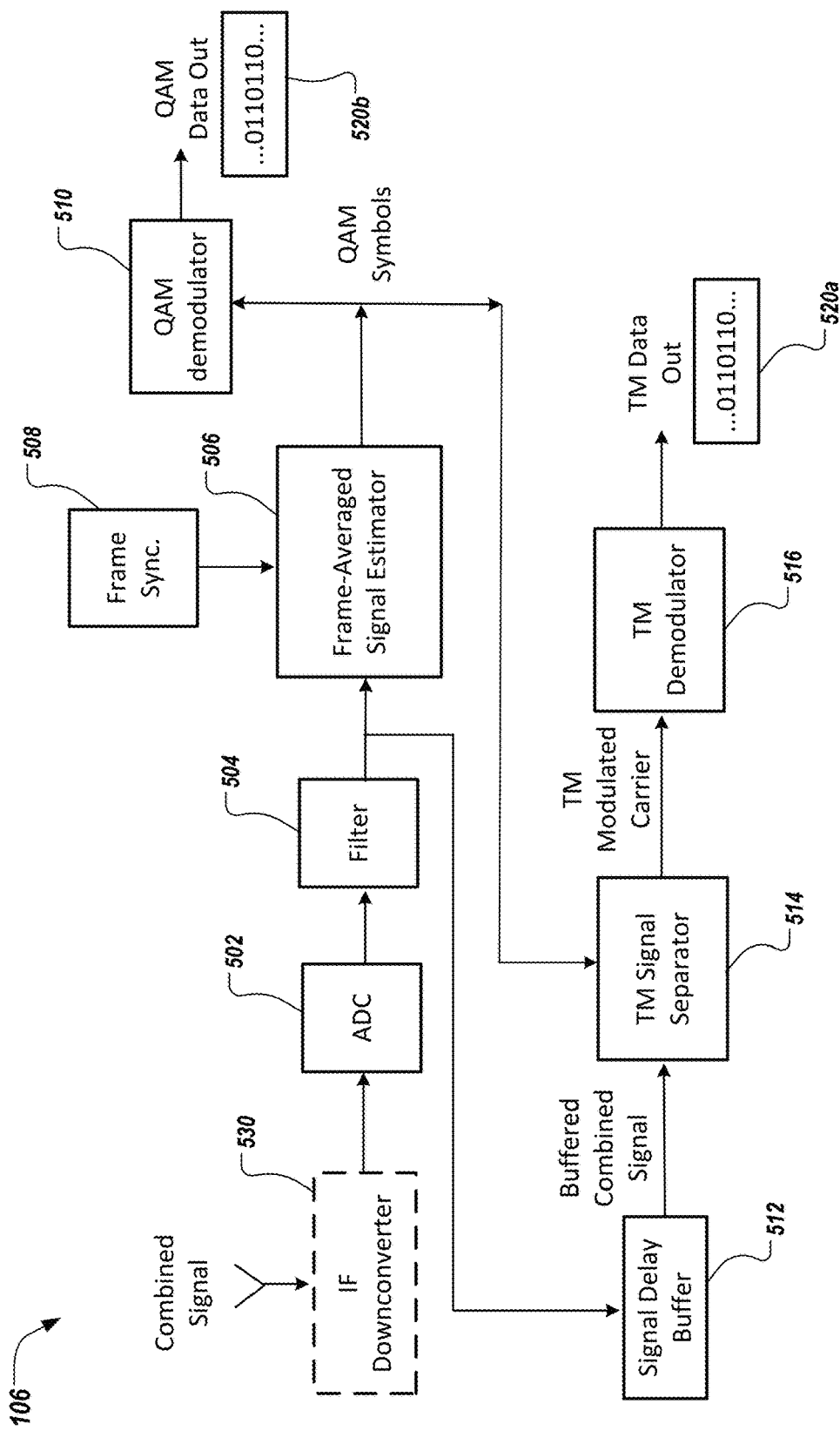
FIG. 5 depicts a block diagram of a representative TM signal receiver in accordance with implementations of the present disclosure.

FIG. 5 depicts a block diagram of a representative TM signal receiver 106 in accordance with implementations of the present disclosure. TM receiver 106 is an integrated TM receiver. That is, TM receiver 106 is integrated with non-TM transmitter components. TM receiver 106 can be implemented in hardware (e.g., as integrated circuits, chip-sets, application specific integrated circuits (ASIC) or field programmable logic arrays (FPGA)) or in software (e.g., as a software defined radio (SDR)). TM receiver 106 includes several component modules which are described in more detail below.

For simplicity of discussion, TM receiver 106 is illustrated and described in the context of receiving a combining TM and QAM signal. However, TM receiver 106 may be configured to receive TM signals combined with other non-TM modulation types including, but not limited to, AM, FM, PM, QPSK, APSK, DPSK, or FSK. That is, for example, in some implementations, QAM components 510 and 512 may be replaced by or supplemented with corresponding modulation components for performing PSK demodulation. In some implementation, for example, TM receiver 106 can include multiple sets of non-TM modulation components. TM receiver 106 can configured to select between receiving TM signals with any of the configured non-TM types of modulation. For example, a processor can be used to select between several non-TM signal types which may be combined with a TM signal.

As a whole, TM receiver 106 receives combined signal (e.g., $V_{comb.}$) that includes a carrier signal modulated with both a TM signal and a QAM signal. TM receiver 106 demodulates the QAM signal. TM receiver 106 can determine average values of the QAM signal over the QAM symbol frames and demodulate the QAM signal using the average values. TM receiver 106 removes the QAM modulation from the combined signal. TM receiver 106 uses the QAM symbol values to remove the QAM modulation from the combined signal, thereby, leaving only the TM signal. TM receiver 106 demodulates the TM signal. TM receiver 106 can demodulate the TM signal by extracting the TM signal (e.g., the internal TM modulation signal) from the phase of the carrier signal. TM receiver 106 identifies the TM symbols by detecting the discrete phase shifts in the TM signal to demodulate the TM signal. For example, TM receiver 106 can compare the TM signal to a reference sinusoid to detect the phase shifts in the TM signal.

In more detail, TM receiver 106 includes several modules, each of which can be implemented in hardware or software. For example, each of the modules can be implemented in hardware as an integrated circuit, a chip-set, an ASIC, FPGA, as a software module (e.g. one or more code blocks), or a combination thereof. TM receiver 106 includes an analog-to-digital converter (ADC) 502, a filter 504, a frame-averaged signal estimator (FASE) 506, a frame synchronizer 508, a QAM demodulator 510, a signal delay buffer 512, a TM signal separator 514, a TM demodulator 516, and, optionally, an IF downconverter 530.

TM receiver 106 receives a combined signal ($V_{comb.}(t) = Q(t)$ A $e^{(i\omega_c t + \Phi_{TM}(t))}$)). In some implementations, TM receiver 106 shifts the combined signal to an intermediate frequency (IF), for example, using IF downconverter 530. In some implementations, TM receiver 106 downshifts the combined signal to baseband. TM receiver 106 can downshift the combined signal to baseband by multiplying the combined signal with an unmodulated sinusoid at the carrier frequency and filtering the combined signal to remove higher order harmonics.

The combined signal is converted from an analog signal to a digital signal by ADC 502 and filtered by filter 504. Filter 504 is a receive filter that filters the combined signal, for example, to remove noise and other extraneous signals. For example, filter 504 can be a band pass filter that matches the pass-band of the transmission channel.

TM receiver 106 supplies the combined signal to signal delay buffer 512 and FASE 506. FASE 506 receives the filtered combined signal. Furthermore, for the n-th QAM symbol frame the combined signal can be written as ($V_{comb.\_n} = |Q_n|$A $e^{(i\Psi_c t + \Phi_{TM}(t))}$)). In some implementations, TM receiver 104 can determine a channel gain by using a known calibration signal. TM receiver 104 can the amplify the combined signal so that the amplitude, A, can be set to 1, leaving ($V_{comb.\_n} = |Q_n|$A $e^{(i\Psi_c t + \Phi_{TM}(t))}$)). FASE 506 may receive data indicating the beginning and end of each QAM frame from frame synchronizer 508. For example, the frame synchronizer 508 can detect the edges of the QAM frames and provide appropriate timing signals to the FASE 506.

FASE 506 determines average values of the combined signal over each QAM symbol frame to recover the QAM symbol value of each QAM frame of the combined signal. The QAM symbols in the combined signal have a constant complex value over each symbol period. Moreover, as discussed above, the phase variations caused by the TM modulation average out over each symbol QAM. FASE 506 can recover the QAM symbol values by determining time averaged values of the combined signal over the QAM symbol frames. For example, FASE 506 can determine the QAM symbol amplitude by determining the mean of the absolute value of the combined signal; mathematically $|Q_n|=<|V_{comb.\_n}|>$, where the angle brackets < > indicate a time average over the n-th QAM frame. In some implementations, the FASE 506 can perform a weighted time average of the combined signal. For example, the time average for each symbol can be weighted based on the respective modulation strengths of the TM signal and the QAM signal.

Figure 6:
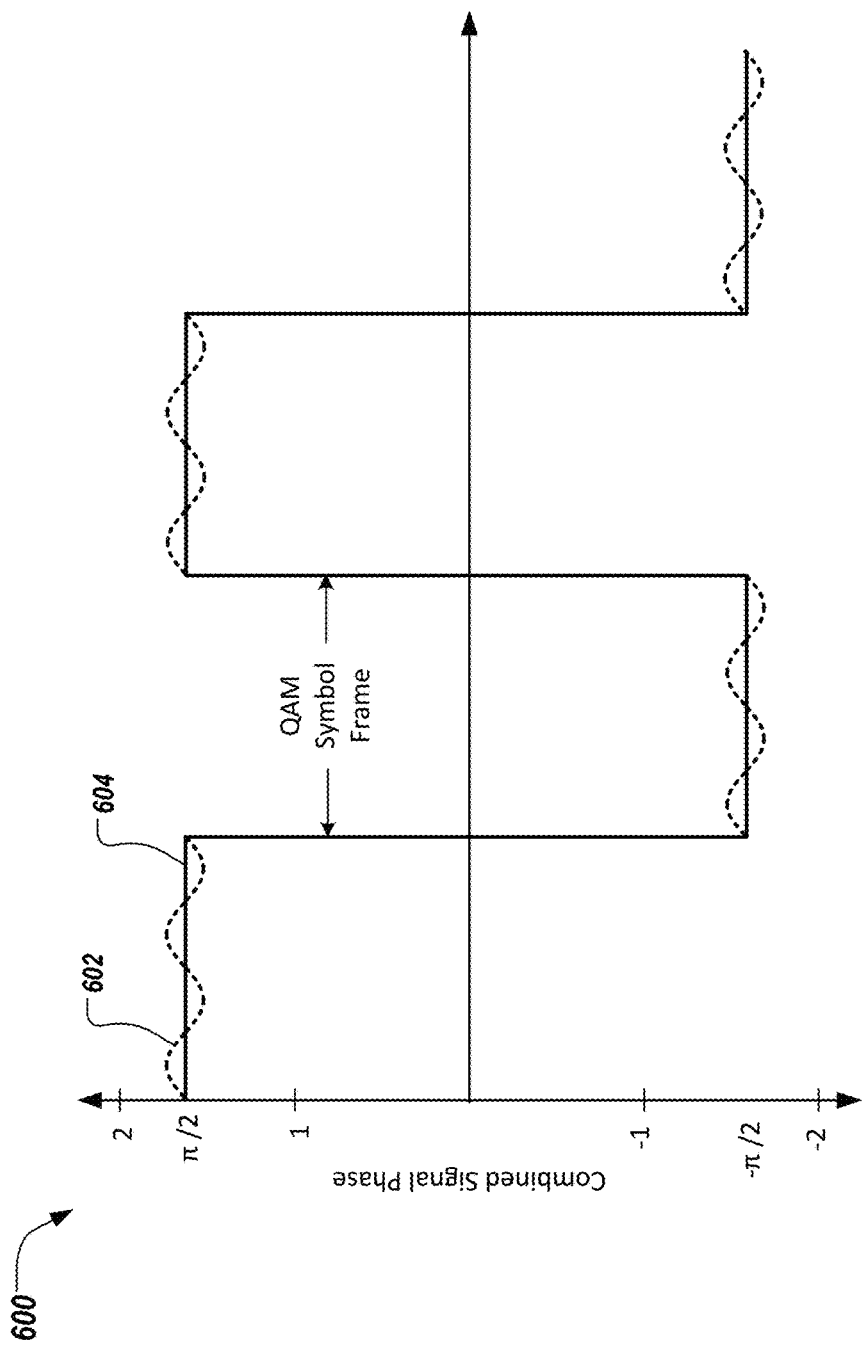
FIG. 6 depicts a graph illustrating phase cancellation of a TM signal over a symbol frame of a non-TM signal in accordance with implementations of the present disclosure.

FASE 506 can determine the QAM symbol phase by taking the arc tangent of the real and imaginary parts of the combined signal; mathematically $\Psi_n=<\arctan(\mathrm{Imag}\{V_{comb.\_n}\}, \mathrm{Re}\{V\_(comb.\_n)\})>$, where the angle brackets < > indicate a time average over the n-th QAM frame, and where arctan( ) represents the four-quadrant arc-tangent function. For example, FIG. 6 shows a graph 600 illustrating a representation of the phase of the combined signal over several QAM symbol frames. The instantaneous phase of the combined signal is shown as dashed line 602. The time averaged QAM phase is shown as solid line 604. As discussed above, the internal TM modulation cause the phase of the combined signal to oscillate, however, the oscillations will average out to zero over each QAM symbol frame, thus, making the TM signal transparent to the QAM signal.

FASE 506 outputs the recovered QAM symbol values to the QAM demodulator and TM signal separator 514. QAM demodulator 510 converts the QAM symbol values to corresponding digital data. QAM demodulator 510 outputs the digital data stream 520b that is received from the QAM portion of the combined signal. Data stream 520b corresponds to the input to TM transmitter 104; data stream 202b described above. In some implementations, TM receiver 106 can split a complex combined signal into in-phase and quadrature phase signals. FASE 506 can perform similar operations for each of the in-phase and quadrature phase signals to obtain average QAM signal magnitude and phase.

In some implementations, the FASE 506 can use an envelope detector to extract the amplitude of the QAM symbols. The FASE 506 can determine the magnitude of each QAM signal using the extracted amplitude.

TM signal separator 514 separates the QAM signal from the combined signal to obtain the TM modulated carrier signal. TM signal separator 514 receives the combined signal from signal delay buffer 512 and recovered QAM symbol values from FASE 506. Signal delay buffer 512 delays the combined signal by an appropriate amount of time such that the QAM symbol values that are recovered by FASE 506 are matched with the corresponding QAM symbol frame of the combined signal, e.g., the n-th QAM symbol is matched to the n-th QAM frame of the combined signal. TM signal separator 514 removes the QAM modulation from the combined signal using the recovered QAM symbol value. For example, TM signal separator 514 can divide out the QAM symbol value from each respective frame of the combined signal, yielding the TM modulated carrier. For example, the operation of the TM signal separator 514, for the n-th QAM symbol frame, can be represented by:

$$V_{TM}(t)_{n\text{-}th\ frame} = \frac{|Q_n|Ae^{(i\Psi_n+\Phi_{TM}(t))}}{|Q_n|e^{(i\Psi_n)}} = Ae^{(\Phi_{TM}(t))}.$$

TM demodulator 516 receives the TM modulated carrier signal from TM signal separator 514 and demodulates the TM signal to obtain digital data in data stream 520a. Data stream 520a corresponds to the input to TM transmitter 104; data stream 202a described above. TM demodulator 516 extracts the TM signal from the TM modulated carrier signal. TM demodulator 516 detects the discrete phase shifts in the TM signal to determine the TM symbol values. TM demodulator 516 converts the TM symbol values to corresponding digital data in data stream 520a.

Figure 7:
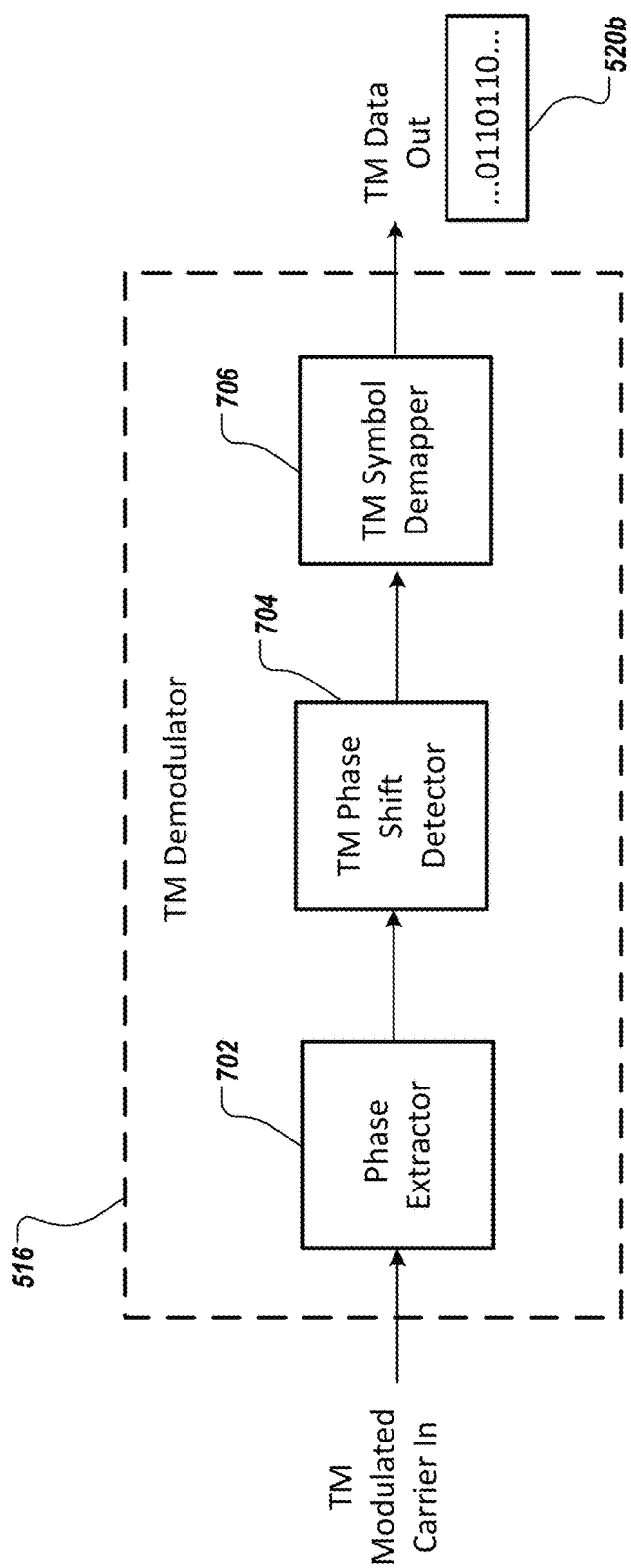
FIG. 7 depicts a block diagram of a representative TM signal demodulator in accordance with implementations of the present disclosure.

For example, FIG. 7 depicts a block diagram of a representative TM signal demodulator 516. TM demodulator 516 can include a phase extractor 702, a phase shift detector 704, and a symbol demapper 706. Phase extractor 702 extracts the TM signal from the phase of the TM modulated carrier signal. For example, the phase extractor 702 can convert complex data received from the TM signal separator 516 to phase data.

Phase shift detector 704 detects the discrete phase shifts in the TM signal that represent the TM symbols. For example, phase shift detector 704 can detect the discrete phase shifts in the TM signal by cross-correlating the TM signal with a reference sinusoid. For example, if the sinusoid signal (e.g., signal A) used by the transmitter 104 to generate the internal TM signal is synchronized with the QAM symbols (as discussed above), TM demodulator 516 can synchronize the reference sinusoid with the QAM symbols to approximate the sinusoidal signal (signal A). Phase shift detector 704 provides the detected phase shift values to symbol demapper 706, which converts the phase shift values (e.g., TM symbol values) to corresponding digital data values. Phase shift detector 704 outputs the digital data stream 520a that is received from the TM portion of the combined signal.

In some implementations, transmitter 104 can transmit a pre-determined TM synchronization signal. For example, a pre-determined synchronization signal can include a pre-determined set of TM symbols. TM demodulator 516 can use the synchronization signal to synchronize the reference signal with the sinusoidal signal used by the transmitter. For example, TM demodulator can adjust the phase of the reference signal to produce the correct TM data symbols from the synchronization signal.

In some implementations, phase shift detector 704 can detect the discrete phase shifts in the TM signal by cross-correlating the TM signal with reference sine and cosine waves (e.g., two sinusoidal reference signals with a 90-degree phase difference between them). The phase shift can be determined by finding the arctangent of the ration between cross-correlation with the sine reference wave and the cosine reference wave.

In some implementations, TM demodulator 704 includes an amplitude shift detector to detect variations in the modulation index of the internal TM signal that represent TM data symbols. For example, an amplitude shift detection can detect amplitude levels in the TM signal in a manner similar to detecting amplitude levels in QAM symbols. Combined amplitude and phase shift values of the TM symbols can be converted to digital data by symbol demapper 706.

Figure 8:
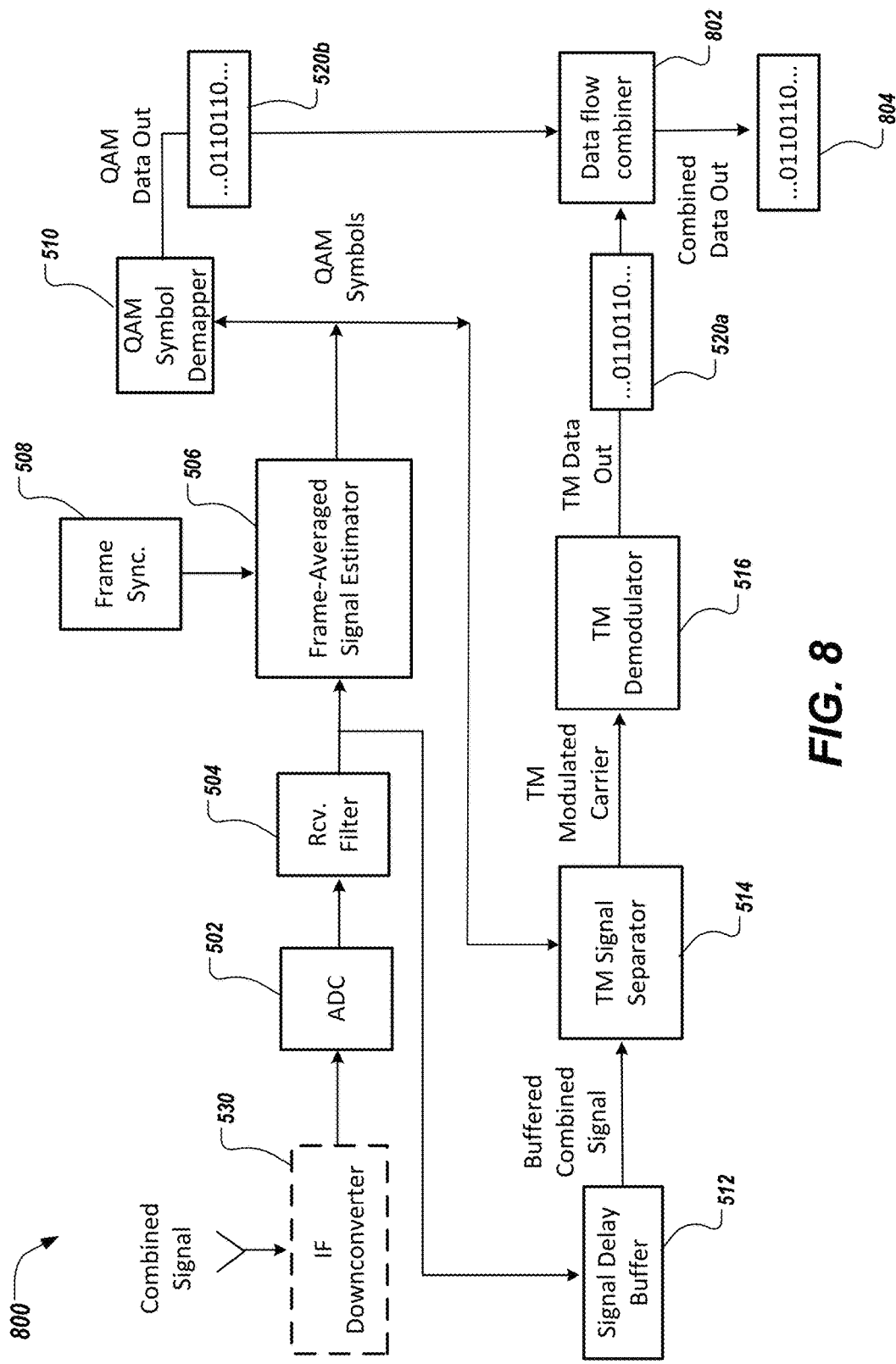
FIG. 8 depicts a block diagram of another representative TM signal receiver in accordance with implementations of the present disclosure

FIG. 8 depicts a block diagram of another representative TM receiver 800 in accordance with implementations of the present disclosure. TM receiver 800 is similar in operation to receiver 106. However, instead of receiving two independent data streams (e.g., data streams 520*a* and 520*b*), one as a TM signal and another as a QAM signal, TM receiver 800 receives one data stream 804 transmitted as a first portion 520*a* by a TM signal and a second portion 520*b* by a QAM signal. TM receiver 800 includes a data flow combiner 802 that combines the respective recovered data streams 520*a* and 520*b* into an output data stream 804 that, for example, corresponds to input data stream 404 of FIG. 4. Data flow combiner 802 can re-combine the recovered data streams 520*a*, 520*b* based on the individual data rates of the TM and QAM signals.

In some implementations, data flow combiner 802 can be dynamically controlled to account for changes in data rate of the TM and QAM signals. For example, if transmitter 400 changes symbol constellation of one or both of the modulation signals due to channel conditions, TM receiver 800 can adjust data flow combiner 802 to account for changes in apportionment of data between the TM and QAM signals in order to properly recombine data streams 520*a* and 520*b*. For example, TM transmitter 400 may send a synchronization data to receiver 800 when the apportionment between the TM and QAM signals is changed in order to permit receiver 800 to properly control data flow combiner 802.

Figure 9:
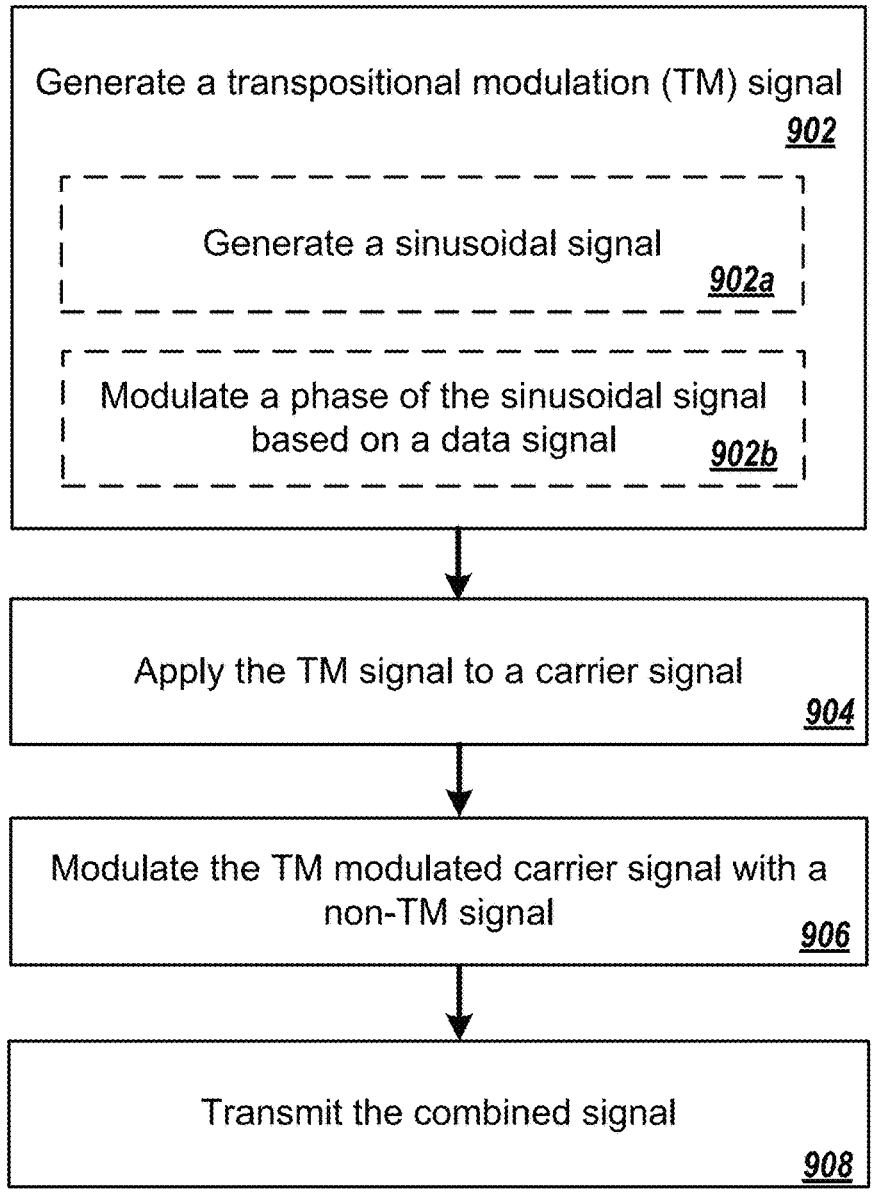

FIG. 9 depicts an example process 900 for modulating a carrier signal. Process 900 can be performed by a transmitter such as transmitter 104 of FIG. 2 or transmitter 400 of FIG. 4. In some examples, the example process 900 can be provided as computer-executable instructions executed using one or more processing devices (e.g., a digital signal processor) or communication devices (e.g., communication devices 102 of FIG. 1). In some examples, the process 900 may be hardwired electrical circuitry, for example, as an ASIC or an FPGA device. In some examples, the process 900 may be executed by an SDR.

A transmitter generates a TM signal (902). For example, the transmitter can generate a TM signal by generating a sinusoidal signal (902*a*), and modulating a phase of the sinusoidal signal (902*b*). The transmitter can generate the sinusoidal signal to have a frequency that is related to the symbol rate of a non-TM signal, the frequency of a carrier signal, or a combination thereof. For example, the transmitter can generate the sinusoidal signal to have a frequency that is an integer multiple of the symbol rate of a non-TM signal with which the TM signal will be combined. The transmitter can generate the sinusoidal signal to have a frequency that is a harmonic of the carrier signal. In some implementations, the transmitter can generate the sinusoidal signal be synchronized with the phase of the carrier signal.

The transmitter can modulate the phase of the sinusoidal signal based on an input data signal. For example, the transmitter can apply discrete phase shifts to the sinusoidal signal that represent digital data of the input data signal. The transmitter can shift the phase of the sinusoidal signal by a discrete phase shift for each data value in the data signal. In other word, the discrete phase shifts can represent TM symbols that correspond to combinations of digital data. For example, an N-ary TM signal can represent N-bits of data in a constellation of $2^N$ TM symbols (e.g., $2^N$ different discrete phase shift values).

The transmitter applies the TM signal to the carrier signal to provide a TM modulated carrier signal (904). For example, the transmitter inserts the TM signal into the phase of a carrier signal to provide a TM modulated carrier signal. For example, the transmitter can add the TM signal to the phase of the carrier signal. In some implementations, the transmitter can insert the TM signal into the frequency of the carrier signal to provide the TM modulated carrier signal. In some implementations, the carrier signal may be a complex carrier.

The transmitter modulates the TM modulated carrier signal with a non-TM signal to provide a combined signal (906), and transmits the combined signal (908). The non-TM signal can include, but is not limited to, a QAM signal, an AM signal, an FM signal, or a PM signal. For example, the transmitter modulate the TM modulated carrier with a QAM signal based on a second input data signal. The second input data signal can be independent from the first input data signal used to produce the TM signal. In some implementations, the transmitter can split an input data signal such that a portion of the input data signal is transmitted as a TM signal and another portion of the input data signal is transmitted as a non-TM signal (e.g., a QAM signal).

In some examples, the TM symbol period is timed to correspond with an integer multiple of the period of the sinusoidal signal. In other words, the TM symbol period may be timed to include an integer number of cycles of the sinusoidal signal.

In some examples, the TM symbol period is related to the symbol period of the non-TM signal. For example, the TM symbol period can be an integer multiple of the symbol period of the non-TM signal. The symbol period of the non-TM signal can be an integer multiple of the symbol period of the TM symbol period.

In some implementations, the transmitter filters the combined signal before transmission. For example, the transmitter may filter the combined signal with a band pass filter to shape symbols of the non-TM signal to meet constraints of a particular transmission channel or transmission medium.

In some examples, the TM modulated carrier signal may not be subsequently modulated with a non-TM signal. In other words, the TM signal can be generated and transmitted alone, without being combined with a non-TM signal.

In some implementations, the carrier signal is modulated with the non-TM signal before applying the TM signal to the carrier. For example, the transmitter can insert the TM signal into the phase of the carrier after the carrier signal is modulated with the non-TM signal.

In some examples, the TM modulated carrier signal may not be subsequently modulated with a non-TM signal. In other words, the TM signal can be generated and transmitted alone, without being combined with a non-TM signal.

FIG. 10 depicts an example process 1000 for modulating a carrier signal. Process 1000 can be performed by a receiver such as receiver 106 of FIG. 5 or receiver 800 of FIG. 8. In some examples, the example process 1000 can be provided as computer-executable instructions executed using one or more processing devices (e.g., a digital signal processor) or communication devices (e.g., communication devices 102 of FIG. 1). In some examples, the process 1000 may be hardwired electrical circuitry, for example, as an ASIC or an FPGA device. In some examples, the process 1000 may be executed by an SDR.

A receiver, receives a combined signal that includes a carrier signal modulate with a transpositional modulating (TM) signal and a non-TM signal (1002). The receiver determines average values of the combined signal over respective symbol frames of the non-TM signal (1004). For example, the receiver can determine time-averaged values of the combined signal for each symbol frame of the non-TM signal. The time-averaged values can include a time-averaged amplitude and a time-averaged phase of the combined signal over the symbol frame of the non-TM signal. For example, any effects of the TM signal on the non-TM signal may average out over each symbol frame of the non-TM signal.

The receiver demodulates the non-TM signal based on the average values (1006). The receiver demodulates the non-TM signal to recover the symbols of the non-TM signal. The receiver can then convert the recovered symbols of the non-TM signal to corresponding digital data values and recover a data stream transmitted in the non-TM signal.

The receiver removes the non-TM signal from the combined signal (1008). For example, the receiver can buffer a copy of the combined signal and use the recovered symbol values of the non-TM signal to remove the non-TM signal from respective frames of the buffered copy of the combined signal. For example, the receiver can divide respective frames of the buffered copy of the combined signal by the magnitude and phase of corresponding ones of the recovered non-TM symbols.

The receiver demodulates the TM signal (1010). For example, the receiver can demodulate the TM signal by detecting the discrete phase shifts of a sinusoidal signal inserted into the phase of the carrier. The receiver can extract the phase of the TM modulated carrier signal to obtain the TM signal. For example, the receiver can convert complex values of the combined signal into time varying phase data after the non-TM signal has been removed. The phase data represents the TM signal as a sinusoidal with discrete phase shifts. The value of each discrete phase shift represents a TM symbol that can be converted to a corresponding digital data value. The receiver can detect the discrete phase shifts by cross-correlating the phase data with a reference signal. For example, the reference signal can be synchronized with the symbol frames of the non-TM signal to approximate the sinusoidal signal used by the transmitter to generate the internal TM signal. The receiver can then convert the recovered TM symbols to corresponding digital data values to recover a second data stream transmitted in the TM signal.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method of modulating a carrier signal, the method comprising:
    generating a transpositional modulation (TM) signal by:
        generating a sinusoidal signal; and
        modulating an amplitude of the sinusoidal signal based on a data signal to provide the TM signal;
    inserting the TM signal into a carrier signal to provide a TM modulated carrier signal; and
    transmitting the TM modulated carrier signal.

2. The method of claim 1, wherein inserting the TM signal into the carrier signal comprises inserting the TM signal into a phase of the carrier signal to provide a TM modulated carrier signal.

3. The method of claim 2, wherein the TM signal is inserted into the phase of the carrier signal by adding the TM signal to the phase of the carrier signal.

4. The method of claim 1, wherein inserting the TM signal into the carrier signal comprises inserting the TM signal into a frequency of the carrier signal to provide a TM modulated carrier signal.

5. The method of claim 4, wherein the TM signal is inserted into the frequency of the carrier signal by adding the TM signal to the frequency of the carrier signal.

6. The method claim 1, wherein modulating the sinusoidal signal based on the data signal to provide the TM signal comprises modulating a phase of the sinusoidal signal based on the data signal to provide the TM signal.

7. The method of claim 6, wherein modulating the phase of the sinusoidal signal based on the data signal to provide the TM signal comprises altering the phase of the sinusoidal signal by discrete phase shifts for each data value in the data signal.

8. The method of claim 7, wherein changes in values of the discrete phase shifts are timed to correspond with an integer multiple of a period of the sinusoidal signal.

9. The method of claim 7, wherein each discrete phase shift is a TM symbol that represents a data value of the data signal.

10. The method of claim 1, wherein modulating the sinusoidal signal based on the data signal comprises modulating both a phase and the amplitude of the sinusoidal signal based on the data signal to provide the TM signal.

11. The method of claim 1, wherein a symbol period of the TM signal is an integer multiple of a period of the sinusoidal signal.

12. The method of claim 1, further comprising, before transmitting the TM modulated carrier signal, filtering the TM modulated carrier signal.

13. The method of claim 1, wherein the carrier signal is an intermediate frequency carrier signal and the method further comprises upshifting the TM modulated carrier signal to a frequency of a transmission carrier signal.

14. The method of claim 1, wherein a symbol period of the TM signal is an integer multiple of a period of the carrier signal.

15. A transmitter comprising:
    at least one processor; and
    a data store coupled to the at least one processor having instructions stored thereon which, when executed by the at least one processor, causes the at least one processor to perform operations comprising:
    generating a transpositional modulation (TM) signal by:
        generating a sinusoidal signal; and
        modulating an amplitude of the sinusoidal signal based on a data signal to provide the TM signal;
    inserting the TM signal into a carrier signal to provide a TM modulated carrier signal; and
    transmitting the TM modulated carrier signal.

16. The transmitter of claim 15, wherein inserting the TM signal into the carrier signal comprises inserting the TM signal into a phase of the carrier signal to provide a TM modulated carrier signal.

17. The transmitter of claim 16, wherein the TM signal is inserted into the phase of the carrier signal by adding the TM signal to the phase of the carrier signal.

18. The transmitter of claim 15, wherein inserting the TM signal into the carrier signal comprises inserting the TM signal into a frequency of the carrier signal to provide a TM modulated carrier signal.

19. The transmitter of claim 18, wherein the TM signal is inserted into the frequency of the carrier signal by adding the TM signal to the frequency of the carrier signal.

20. The transmitter of claim 15, wherein modulating the sinusoidal signal based on the data signal to provide the TM signal comprises modulating a phase of the of the sinusoidal signal based on the data signal to provide the TM signal.

21. The transmitter of claim 20, wherein modulating the phase of the sinusoidal signal based on the data signal to provide the TM signal comprises altering the phase of the sinusoidal signal by discrete phase shifts for each data value in the data signal.

22. The transmitter of claim 21, wherein changes in values of the discrete phase shifts are timed to correspond with an integer multiple of a period of the sinusoidal signal.

23. The transmitter of claim 21, wherein each discrete phase shift is a TM symbol that represents a data value of the data signal.

24. The transmitter of claim 15, wherein modulating the sinusoidal signal based on the data signal comprises modulating both a phase and the amplitude of the sinusoidal signal based on the data signal to provide the TM signal.

25. The transmitter of claim 15, wherein a symbol period of the TM signal is an integer multiple of a period of the sinusoidal signal.

26. The transmitter of claim 15, further comprising, before transmitting the TM modulated carrier signal, filtering the TM modulated carrier signal.

27. The transmitter of claim 15, wherein the carrier signal is an intermediate frequency carrier signal and the operations further comprise upshifting the TM modulated carrier signal to a frequency of a transmission carrier signal.

28. The transmitter of claim 15, wherein the at least one processor includes one of: a field programmable gate array (FPGA), an application specific integrated circuit (ASIC), or a software defined radio (SDR).

* * * * *